United States Patent
Liu et al.

(10) Patent No.: US 12,256,374 B2
(45) Date of Patent: Mar. 18, 2025

(54) METHODS AND APPARATUSES FOR SRS CONFIGURATION AND TRANSMISSION

(71) Applicant: LENOVO (BEIJING) LIMITED, Beijing (CN)

(72) Inventors: Bingchao Liu, Beijing (CN); Chenxi Zhu, Beijing (CN); Wei Ling, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 532 days.

(21) Appl. No.: 17/610,817

(22) PCT Filed: May 13, 2019

(86) PCT No.: PCT/CN2019/086645
§ 371 (c)(1),
(2) Date: Nov. 12, 2021

(87) PCT Pub. No.: WO2020/227889
PCT Pub. Date: Nov. 19, 2020

(65) Prior Publication Data
US 2022/0210803 A1  Jun. 30, 2022

(51) Int. Cl.
*H04W 72/1263* (2023.01)
*H04L 5/00* (2006.01)
(Continued)

(52) U.S. Cl.
CPC ....... *H04W 72/1263* (2013.01); *H04L 5/0012* (2013.01); *H04L 27/2607* (2013.01); *H04W 72/0446* (2013.01); *H04W 72/23* (2023.01)

(58) Field of Classification Search
CPC ......... H04W 72/1263; H04W 72/0446; H04W 72/23; H04W 72/0453; H04L 5/0012;
(Continued)

(56) References Cited

U.S. PATENT DOCUMENTS

| 2017/0230997 | A1* | 8/2017 | Damnjanovic | ......... H04L 5/005 |
| 2019/0174466 | A1* | 6/2019 | Zhang | ................... H04L 5/0057 |

(Continued)

FOREIGN PATENT DOCUMENTS

| CN | 102083033 A | 6/2011 |
| CN | 106549695 A | 3/2017 |

(Continued)

OTHER PUBLICATIONS

Lenovo, Motorola Mobility, Discussion of additional SRS symbols, 3GPP TSG RAN WG1 Meeting #97, R1-1906273, May 13-17, 2019, pp. 1-6, Reno, USA.

(Continued)

*Primary Examiner* — Yaotang Wang
(74) *Attorney, Agent, or Firm* — Kunzler Bean & Adamson

(57) ABSTRACT

Methods and apparatuses for UE grouping are disclosed. A method at a base unit comprises configuring one or more higher layer parameter sets for SRS transmission with at least one of frequency hopping, repetition and antenna switching and transmitting a DCI containing a non-zero SRS request field or a higher layer signaling to trigger a SRS transmission in the symbols in one or more normal subframes.

17 Claims, 22 Drawing Sheets

(51) Int. Cl.
*H04L 27/26* (2006.01)
*H04W 72/0446* (2023.01)
*H04W 72/23* (2023.01)

(58) Field of Classification Search
CPC ..... H04L 27/2607; H04L 1/08; H04L 5/0051; H04L 5/0096
See application file for complete search history.

(56) References Cited

U.S. PATENT DOCUMENTS

2019/0356445 A1* 11/2019 Manolakos ............ H04L 5/0051
2022/0174700 A1*  6/2022 Go .................... H04L 27/26025

FOREIGN PATENT DOCUMENTS

| CN | 107294686 A | 10/2017 |
| CN | 107733606 A | 2/2018 |
| EP | 2555573 A1 | 2/2013 |

OTHER PUBLICATIONS

Qualcomm Incorporated, Additional SRS symbols, 3GPP TSG-RAN WG1 #96bis, R1-1904532, Apr. 8-12, 2018, pp. 1-9, Xi'an, China.
Huawei, Hisilicon, Feature summary on LTE DL MIMO efficiency enhancement, 3GPP TSG RAN WG1 Meeting #96bis, R1-1905594, Apr. 8-12, 2019, pp. 1-13, Xian, China.
International Searching Authority, "Written Opinion of the International Searching Authority," PCT/CN2019/086645, Jan. 20, 2020, pp. 1-3.

\* cited by examiner (a) Concurrent configuration of repetition and antenna switching with R=2 without guard period for 1T4R UE (b) Concurrent configuration of repetition and antenna switching with R=2 with guard period for 1T4R UE

METHODS AND APPARATUSES FOR SRS CONFIGURATION AND TRANSMISSION

FIELD

The subject matter disclosed herein generally relates to wireless communications and, more particularly, to methods and apparatuses for SRS configuration and transmission.

BACKGROUND

The following abbreviations are herewith defined, some of which are referred to within the following description: Third Generation Partnership Project (3GPP), European Telecommunications Standards Institute (ETSI), Frequency Division Duplex (FDD), Frequency Division Multiple Access (FDMA), Long Term Evolution (LTE), New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), Personal Digital Assistant (PDA), User Equipment (UE), Uplink (UL), Evolved Node B (eNB), Next Generation Node B (gNB), New Radio (NR), Downlink (DL), Central Processing Unit (CPU), Graphics Processing Unit (GPU), Field Programmable Gate Array (FPGA), Dynamic RAM (DRAM), Synchronous Dynamic RAM (SDRAM), Static RAM (SRAM), Liquid Crystal Display (LCD), Light Emitting Diode (LED), Organic LED (OLED), Multiple-Input Multiple-Output (MIMO), Frequency Range 2 (FR2), Physical Uplink Shared Channel (PUSCH), Physical Downlink Control Channel (PDCCH), Sounding Reference Signal (SRS), SRS Resource Indicator (SRI), Downlink Control Information (DCI), Resource Block (RB), Non Zero Power (NZP) Channel State Information Reference Signal (CSI-RS), Time Division Duplex (TDD), Radio Resource Control (RRC), Media Access Control (MAC).

SRS is transmitted on the uplink channel to allow the base station to estimate the state of the uplink channel. SRS transmission can also be used for uplink timing estimation as well as estimating downlink channel conditions assuming downlink and uplink channel reciprocity.

At present, enhancement to SRS capacity and coverage has been approved in LTE Release 16. More than one symbol in a normal subframe can be used for SRS transmission in LTE Release 16 with the SRS transmitted at symbols other than the last symbol in a normal subframe is referred to as additional SRS. Aperiodic SRS transmission for additional SRS symbol(s) can be configured in any symbols other than the last symbol in the normal subframe. SRS transmitted at the last symbol in a normal subframe is referred to as a legacy SRS.

Traditionally, repetition is not supported for legacy SRS and frequency hopping is only supported for periodic SRS transmitted in a normal subframe.

In TS 36.211, reference signal sequence $r_{u,v}^{(\alpha,\delta)}(n)$ is defined by a cyclic shift $\alpha$ of a base sequence $\bar{r}_{u,v}(n)$ according to $$r_{u,v}^{(\alpha,\delta)}(n) = e^{j\alpha n}\bar{r}_{u,v}(n), 0 \leq n < M_{sc}^{RS}$$

where $M_{sc}^{RS}=mN_{sc}^{RB}/2^\delta$ is the length of the reference signal sequence and $1 \leq m \leq N_{RB}^{max,UL}$, $N_{RB}^{max,UL}$ is the maximum UL bandwidth. Multiple reference signal sequences are defined from a single base sequence through different values of $\alpha$.

Base sequences $\bar{r}_{u,v}(n)$ are divided into groups, where $u \in \{0,1,\ldots,29\}$ is the group number and v is the base sequence number within the group, such that each group contains one base sequence (v=0) of each length $M_{sc}^{RS}=mN_{sc}^{RB}$, $1 \leq m \leq 5$ and two base sequences (v=0,1) of each length $M_{sc}^{RS}=mN_{sc}^{RB}$, $6 \leq m \leq N_{RB}^{max,UL}$. The sequence group number u and the number v within the group may vary in time.

For group hopping, the sequence-group number u in slot $n_s$ is defined by a group hopping pattern $f_{gh}(n_s)$ and a sequence-shift pattern $f_{ss}$ according to $$u = (f_{gh}(n_s) + f_{ss}) \bmod 30$$

There are 17 different hopping patterns and 30 different sequence-shift patterns. Sequence-group hopping can be enabled or disabled by means of the cell-specific parameter Group-hopping-enabled provided by higher layers.

The group-hopping pattern $f_{gh}(n_s)$ may be different for PUSCH, (S)PUCCH and SRS and is given by $$f_{gh}(n_s) = \begin{cases} 0 & \text{if group hopping is disabled} \\ \left(\sum_{i=0}^{7} c(8n_s + i) \cdot 2^i\right) & \text{if group hopping is enabled} \end{cases}$$

where the pseudo-random sequence c(i) is defined by clause 7.2 in TS36.211. The pseudo-random sequence generator shall be initialized with $$c_{init} = \left\lfloor \frac{n_{ID}^{RS}}{30} \right\rfloor$$

at the beginning of each radio frame where $n_{ID}^{RS}$ is given by clause 5.5.1.5 in TS36.211.

For SRS, the sequence-shift pattern $f_{ss}^{SRS}$ is given by $f_{ss}^{SRS}=n_{ID}^{RS}$ is given by clause 5.5.1.5 in TS36.211.

Sequence hopping only applies for reference-signals of length $M_{sc}^{RS} \geq 6N_{sc}^{RB}$.

For reference-signals of length $M_{sc}^{RS} < 6N_{sc}^{RB}$, the base sequence number v within the base sequence group is given by v=0.

For reference-signals of length $M_{sc}^{RS} \geq 6n_{sc}^{RB}$, the base sequence number v within the base sequence group in slot $n_s$ is defined by $$v = \begin{cases} c(n_s) & \text{if group hopping is disabled and sequence hopping is enabled} \\ 0 & \text{otherwise} \end{cases}$$

where the pseudo-random sequence c(i) is given by clause 7.2. The parameter Sequence-hopping-enabled provided by higher layers determines if sequence hopping is enabled or not.

For SRS, the pseudo-random sequence generator shall be initialized with $$c_{init} = \left\lfloor \frac{n_{ID}^{RS}}{30} \right\rfloor \cdot 2^5 + (n_{ID}^{RS} + \Delta_{ss}) \bmod 30$$

at the beginning of each radio frame where $n_{ID}^{RS}$ is given by clause 5.5.1.5 and $\Delta_{ss}$ is given by clause 5.5.1.3.

It has been agreed that antenna switching and/or frequency hopping (either group hopping or sequence hopping) and/or repetition will be supported for aperiodic additional SRS transmission. However, no detailed configuration has yet to be studied.

BRIEF SUMMARY

It is an object of the present application to propose detailed SRS configuration to support antenna switching and/or frequency hopping and/or repetition. In particular, methods and apparatuses for SRS configuration and transmission are disclosed.

In one embodiment, a method at a base unit comprises configuring one or more higher layer parameter sets for SRS transmission with at least one of frequency hopping, repetition and antenna switching; and transmitting a DCI containing a non-zero SRS request field or a higher layer signaling to trigger an SRS transmission in the symbols in one or more normal subframes.

In some embodiment, one of the parameter sets contains, for one aperiodic SRS transmission, 2 hops intra-subframe frequency hopping, with Ns=4 and R=2, or Ns=6 and R=3 or Ns=8 and R=4, each hop has the same bandwidth and each of antenna ports used for transmitting SRS is mapped to the same set of subcarriers, wherein Ns is the number of SRS symbols configured for transmitting SRS and R is repetition factor. In the condition that no guard period is configured, the start symbol of the SRS transmission is configured as one of {0,1,2,3,4,5,6,7,8,9,10} corresponding to Ns=4, or one of {0,1,2,3,4,5,6,7,8} corresponding to Ns=6, or one of {0,1,2,3,4,5,6} corresponding to Ns=8. In the condition that a one-symbol guard period is configured for a frequency hopping, the start symbol of the SRS transmission is configured as one of {0,1,2,3,4,5,6,7,8,9} corresponding to Ns=4, or one of {0,1,2,3,4,5,6,7} corresponding to Ns=6, or one of {0,1,2,3,4,5} corresponding to Ns=8.

In some embodiment, one of the parameter sets contains, for periodic SRS with intra-subframe and inter-subframe frequency hopping, Ns=2 or 4 symbols in one subframe, and the SRS for all antenna ports occupies the same symbol location(s) in each subframe, wherein Ns is the number of SRS symbols in one subframe configured for transmitting SRS. when frequency hopping is configured with Ns=4 in one subframe with repetition factor R=2 or 4, each of the antenna ports is mapped to different sets of subcarriers across adjacent symbols in each subframe, and each of the antenna ports is mapped to the same set of subcarriers within each repetition of adjacent symbols in each subframe. When Ns=R=2 or 4 and frequency hopping is configured, each of the antenna ports is mapped to the same sets of subcarriers within each repetition of adjacent symbols in each subframe. In the condition that no guard period is configured, the start symbol of the SRS transmission is configured as one of {0,1,2,3,4,5,6,7,8,9,10,11,12} corresponding to Ns=2, or one of {0,1,2,3,4,5,6,7,8,9,10} corresponding to Ns=4. In the condition that a one-symbol guard period is configured for a frequency hopping, the start symbol of the SRS transmission is configured as one of {0,1,2,3,4,5,6,7,8,9,10,11} corresponding to Ns=2, or one of {0,1,2,3,4,5,6,7,8,9} corresponding to Ns=4.

In some embodiment, one of the parameter sets contains, for one aperiodic SRS transmission with antenna switching for a 1T4R capability UE without guard period, Nst-total=8 symbols with 2 hops intra-subframe frequency hopping in one subframe, or Nst-total=16 symbols with 4 hops intra-subframe frequency hopping in two subframes, wherein Nst-total is the number of adjacent SRS symbols configured for SRS. In other embodiment, one of the parameter sets contains, for one aperiodic SRS transmission with antenna switching for a 1T4R capability UE with guard period for antenna switching within a subframe, Nst-total=11 symbols with 2 hops intra-subframe frequency hopping in one subframe, or Nst-total=18 symbols with 4 hops intra-subframe frequency hopping in two subframes, wherein Nst-total is the number of adjacent SRS symbols configured for SRS. The full sounding bandwidth for each antenna port is 2 times of bandwidth of a subband across 2 adjacent symbols in one subframe and each of the antenna ports in said one subframe is mapped in the 2 adjacent symbols, or the full sounding bandwidth for each antenna port is 4 times of bandwidth of a subband across 4 adjacent symbols in one subframe and each of the antenna ports in said one subframe is mapped in the 4 adjacent symbols, and different antenna ports are mapped to different symbols. When Nst-total=16 or 18 symbols with 4 hops frequency hopping and antenna switching for one aperiodic SRS transmission across two normal subframes, two antenna ports are transmitted in each subframe or one antenna port is transmitted in one subframe and the other three antenna ports are transmitted in the other subframe.

In some embodiment, one of the parameter sets contains, for one aperiodic SRS transmission with antenna switching for a 1T4R capability UE without guard period, Nst-total=8 with repetition factor R=2 in one subframe, or Nst-total=12 with repetition factor R=3 in one subframe, or Nst-total=16 with repetition factor R=4 in two subframes, wherein Nst-total is the number of adjacent SRS symbols configured for SRS. In other embodiment, one of the parameter sets contains, for one aperiodic SRS transmission with antenna switching for a 1T4R capability UE with guard period for antenna switching within a subframe, Nst-total=11 with repetition factor R=2 in one subframe, or Nst-total=14 with repetition factor R=3 in one subframe, or Nst-total=18 with repetition factor R=4 in two subframes, wherein Nst-total is the number of adjacent SRS symbols configured for SRS. Each of the antenna ports is mapped in all the R adjacent symbols to the same set of subcarriers, and different antennas are mapped to different symbols. When Nst-total=16 or 18 symbols with repetition factor R=4 and antenna switching for one aperiodic SRS transmission across two normal subframes, two antenna ports are transmitted in each subframe or one antenna port is transmitted in one subframe and the other three antenna ports are transmitted in the other subframe.

In some embodiment, the method comprises transmitting a DCI with non-zero SRS request field to trigger an aperiodic SRS transmission across at least two normal subframes. The aperiodic SRS triggered by one DCI may be transmitted in both the additional SRS symbols and legacy SRS symbol.

In another embodiment, a method at a remote unit, comprises receiving a DCI containing a non-zero SRS request field or a higher layer signaling to trigger a SRS transmission in the symbols in one or more normal subframes and transmitting a SRS in the triggered symbols in one or more normal subframes.

In yet another embodiment, a base unit comprises a processor that configures one or more higher layer parameter sets for SRS transmission with at least one of frequency hopping, repetition and antenna switching; and a transceiver that transmits a DCI containing a non-zero SRS request field or a higher layer signaling to trigger a SRS transmission in the symbols in one or more normal subframes.

In further embodiment, a remote unit comprises a receiver that receives a DCI containing a non-zero SRS request field or a higher layer signaling to trigger a SRS transmission in the symbols in one or more normal subframes and a transmitter that transmits a SRS in the triggered symbols in one or more normal subframes.

It will be appreciated by persons skilled in the art that the effects that could be achieved with the present disclosure are not limited to what has been particularly described hereinabove and the above and other effects that the present disclosure could achieve will be more clearly understood from the following detailed description

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered as limiting of scope, the embodiments will be described and explained with additional specificity and detail using accompanying drawings, in which.

DETAILED DESCRIPTION

Figure 1:
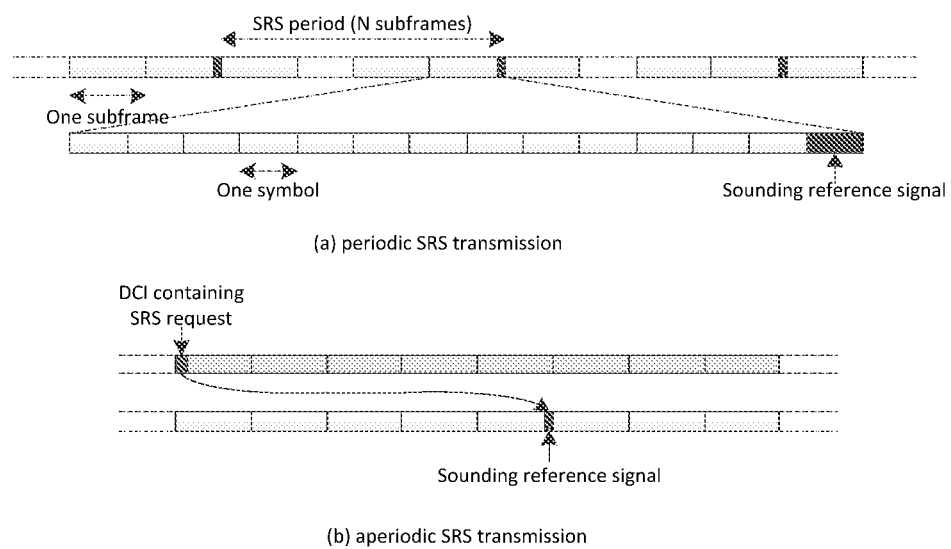
FIGS. 1(a) and (b) are schematic diagrams illustrating legacy SRS transmission.

As will be appreciated by one skilled in the art that certain aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may contain a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may include any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, described features, structures, or characteristics of various embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of different embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding figures. Like numbers refer to like elements in all figures, including alternate embodiments of like elements.

FIGS. 1(a) and (b) are schematic diagrams illustrating legacy SRS transmission.

There are two types of SRS transmission defined in LTE Release 15, i.e. a periodic SRS transmission triggered by higher layer signaling and aperiodic SRS (may be referred to as type 1 SRS) transmission triggered by DCI. As illustrated in FIG. 1(a), UE transmits SRS with a certain period, for example N subframes, which is configured by higher layer signaling (not shown in FIG. 1(a)). SRS can only be transmitted at the last symbol of a normal subframe in LTE Release 15. As illustrated in FIG. 1(b), UE transmits aperiodic SRS (shown as Sounding reference signal in FIG. 1(b)) in response to a SRS request contained in a DCI (shown as DCI containing SRS request in FIG. 1(b)).

Additional SRS is introduced in LTE Release 16 to enhance the SRS capacity. The additional SRS can be transmitted at any symbols other than the last symbol in the normal subframe.

Figure 2:
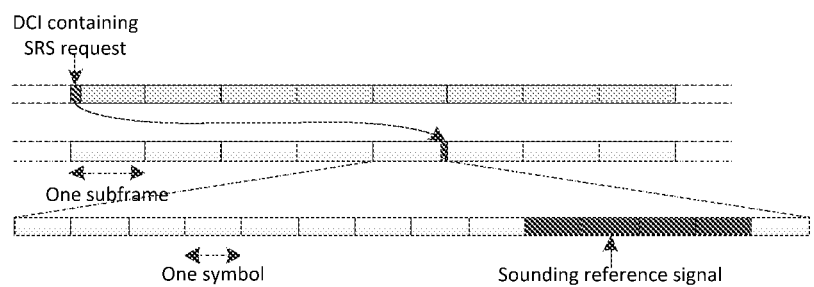
FIG. 2 is a schematic diagram illustrating additional SRS transmission.

FIG. 2 is a schematic diagram illustrating additional SRS transmission.

As illustrated in FIG. 2, UE transmits an aperiodic SRS triggered by a received DCI containing an SRS request field. The aperiodic SRS is transmitted at 10th, 11th, 12th, and 13th symbols in a normal subframe.

Incidentally, it is a common knowledge that one subframe consists of 14 symbols, referred to as 0, 1, 2, 3, 4, 5, 6, 7, 8, 9, 10, 11, 12 and 13 symbols, or as a 1st, 2nd, 3rd, 4th, 5th, 6th, 7th, 8th, 9th, 10th, 11th, 12th, 13th and 14th symbols. It is obvious that the 10th, the 11th, the 12th, and the 13th symbols may also be referred to as symbols 9, 10, 11 and 12.

Figure 3:
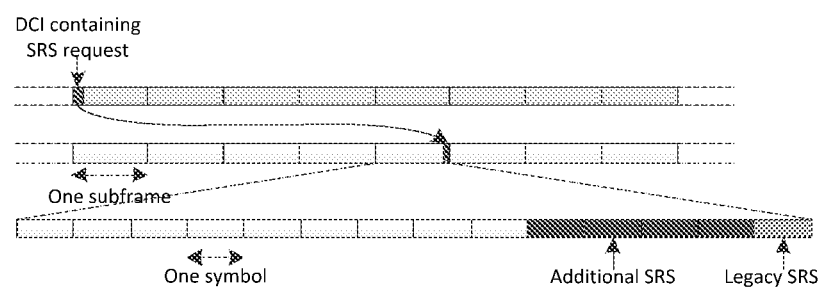
FIG. 3 is a schematic diagram illustrating the concurrent transmission of additional SRS and legacy SRS.

FIG. 3 is a schematic diagram illustrating the concurrent transmission of additional SRS and legacy SRS.

Aperiodic additional SRS and aperiodic legacy SRS can be transmitted in the same subframe. As illustrated in FIG. 3, a DCI containing SRS request field triggers the transmission of aperiodic additional SRS and aperiodic legacy SRS. The additional SRS is transmitted at the 10th, the 11th, the 12th, and the 13th symbols (i.e. symbols 9, 10, 11 and 12) in a subframe, while the legacy SRS is transmitted only at the 14th symbol (i.e. symbol 13) which is the last symbol in the same subframe.

Figure 4:
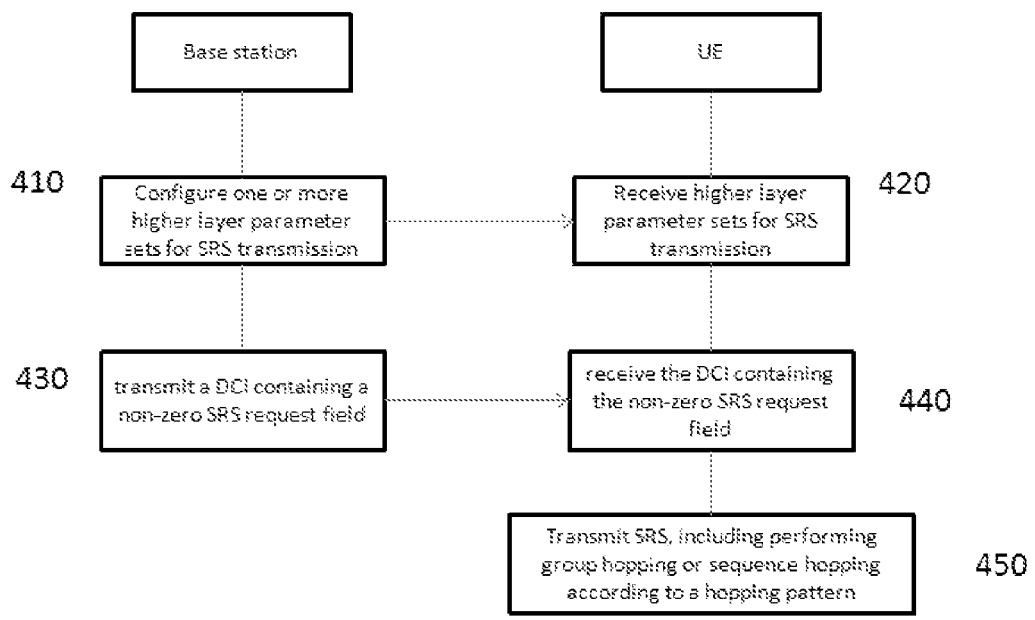
FIG. 4 a flow chart diagram illustrating a method for SRS configuration and transmission.

FIG. 4 is a flow chart diagram illustrating a method for SRS configuration and transmission.

At step 410, a base station configures one or more higher layer parameter sets for SRS transmission supporting at least one of frequency hopping, repetition, and antenna switching.

The above description with reference to FIGS. 1-3 only describes SRS transmission by a UE, without mentioning antenna (or antenna port). As well understood by a person skilled in the art, the UE may have more than one antenna port to perform transmission.

Frequency hopping means that a specific antenna port transmits SRS in more than one set of subcarriers across multiple symbols. That is, a specific antenna port transmits SRS in one set of subcarriers in one symbol, and then hops to another set of subcarriers (i.e. transmits SRS in the other set of subcarriers) in another symbol. If there are N sets of subcarriers on which a specific antenna port transmits SRS, they are referred to as N hops frequency hopping.

In the following disclosure, a set of subcarriers on which a specific antenna port transmits SRS is referred to a subband. It should be noted that there might be more than one set of subcarriers in one subband.

Repetition means that a specific antenna port transmits SRS in more than one symbol using the same configuration parameters. A repetition factor "R" refers to the times of SRS transmission by the specific antenna port in the same subband (more specifically, in the same set of subcarriers). For example, the repetition factor 2 means that the specific antenna port transmits SRS in two symbols (e.g. two consecutive symbols) repeatedly.

Multiple antenna ports of the UE may or may not perform transmission simultaneously. For the antenna ports than cannot transmit simultaneously, antenna switching means that after one or more antenna ports that can perform transmission simultaneously perform transmission (for example of SRS), one or more other antenna ports that cannot transmit simultaneously with the one or more antenna ports perform transmission (for example of SRS).

Each higher layer parameter set includes at least the symbols occupied by the corresponding SRS transmission, i.e. "l" symbols, in which $l \in \{0, 1, \ldots, N_{symb}^{SRS}-1\}$, where $N_{symb}^{SRS}$ is the number of configured SRS symbols. The detailed configuration of SRS will be discussed later.

At step 420, UE receives the higher parameter sets for SRS transmission.

At step 430, the base station transmits a DCI containing a non-zero SRS request field to trigger an aperiodic SRS transmission in the symbols in one or more normal subframe. Incidentally, in a condition of periodic SRS transmission, a higher layer signaling rather than the DCI containing the non-zero SRS request field is used for triggering the periodic SRS transmission.

At step 440, the UE receives the DCI containing the non-zero SRS request field for triggering the aperiodic SRS transmission. Similarly, the UE receives the higher layer signaling for triggering the periodic SRS transmission in the condition of periodic SRS transmission.

At step 450, upon receiving the DCI (or in the condition of periodic SRS transmission, receiving higher layer signaling) for triggering SRS transmission, UE transmits SRS in the triggered symbols in one or more normal subframe according to the higher layer parameter set associated with the received SRS request value contained in the SRS request field. In particular, the UE performs group hopping or sequence hopping according to a hopping pattern determined at least based on the number of configured SRS symbols $N_{symb}^{SRS}$ and $l \in \{0, 1, \ldots, N_{symb}^{SRS}-1\}$ being the symbol number occupied by the corresponding SRS transmission. In particular, if the group hopping is enabled and the sequence hopping is disabled, UE performs the group hopping with the pattern $f_{gh}(n_s, l) = (\sum_{i=0}^{7} c(8(n_s N_{symb}^{SRS}+l) + i) \cdot 2^i) \mod 30$. If the group hopping is disabled and the sequence hopping is enabled, the UE performs the sequence hopping with the pattern $v = c(n_s N_{symb}^{SRS}+l)$ where the pseudo-random sequence c(i) is defined as $$c(i) = (x_1(i+N) + x_2(i+N)) \mod 2$$
$$x_1(i+31) = (x_1(i+3) + x_1(i)) \mod 2$$
$$x_2(i+31) = (x_2(i+3) + x_2(i+2) + x_2(i+1) + x_2(i)) \mod 2$$

where N=1600 and the first m-sequence shall be initialized with $x_1(0)=1, x_1(i)=0, i=1,2,\ldots,30$. The initialization of the second m-sequence is denoted by $$c_{init} = \left\lfloor \frac{n_{ID}^{RS}}{30} \right\rfloor \cdot 2^5 + (n_{ID}^{RS} + \Delta_{ss}) \bmod 30$$

at the beginning of each radio frame where $n_{ID}^{RS}$ is virtual cell ID for SRS and $\Delta_{ss} \in \{0, 1, \ldots, 29\}$.

Optionally, for periodic transmission, the UE may count the number of UE-specific SRS transmissions according to $$n_{SRS} = \begin{cases} 2N_{SP}n_f + 2(N_{SP}-1)\left\lfloor \frac{n_s}{10} \right\rfloor + \left\lfloor \frac{T_{offset}}{T_{offset\_max}} \right\rfloor + \left\lfloor \frac{l}{R} \right\rfloor & \text{or 2 ms SRS periodicity of frame structure type 2} \\ \left\lfloor \frac{n_f \times 10 + \lfloor n_s/2 \rfloor}{T_{SRS}} \right\rfloor \times \left( \frac{N_{symb}^{SRS}}{R} \right) + \left\lfloor \frac{l}{R} \right\rfloor, & \text{otherwise} \end{cases}$$

where $T_{SRS}$ is UE-specific periodicity of SRS transmission, $T_{offset}$ is SRS subframe offset and $T_{offset\_max}$ is the maximum value of $T_{offset}$ for a certain configuration of SRS subframe offset. $N_{SP}$ is the number of downlink to uplink switch points within the radio frame, $n_f$ is the system frame number and $n_s$ is the slot number within a radio frame. R is the repetition factor.

Hereinafter, the configuration of SRS transmission supporting at least one of frequency hopping, repetition, and antenna switching is described in detail.

In the following description, "Nst" denotes the aforementioned $N_{symb}^{SRS}$, i.e. the number of configured adjacent symbols for SRS; "Ns" denotes the number of symbols configured for actually transmitting SRS in view that one or more configured symbols may be used as guard period; The repetition factor "R" (or "repetition") denotes the repetition times for the SRS transmitted with the same set of subcarriers and with the same antenna port using the same configuration parameters.

According to a first embodiment, frequency hopping in one subframe is not configured, the repetition "R" is configured to be equal to Nst, and no guard period is configured (i.e. Ns=Nst). The antenna port in this subframe is mapped to the same set of subcarriers in all the Nst symbols. The SRS transmission according to the first embodiment may be periodic or aperiodic.

According to a second embodiment, a UE may be configured with Nst=2 or 4 or 8 adjacent symbols without guard period (i.e. Ns=Nst), and a repetition R=1 (i.e. no repetition). The Ns symbols are adjacent within a subframe. The frequency hopping is intra-subframe. The full hopping bandwidth is Ns times of bandwidth of a subband across the configured symbols, assuming that the bandwidth of each subband is the same.

FIGS. 5(a), (b) and (c) illustrates an example of aperiodic SRS transmission according to the second embodiment, in which FIG. 5(a) indicates Ns=2 and R=1; FIG. 5(b) indicates Ns=4 and R=1; and FIG. 5(c) indicates Ns=8 and R=1. As shown in FIG. 5(a), at symbol #0, SRS is transmitted in subband #2, and at symbol #1, SRS is transmitted in subband #1. In FIG. 5(b) and FIG. 5(c), at different symbols, SRS is transmitted in different subbands.

Figure 5:
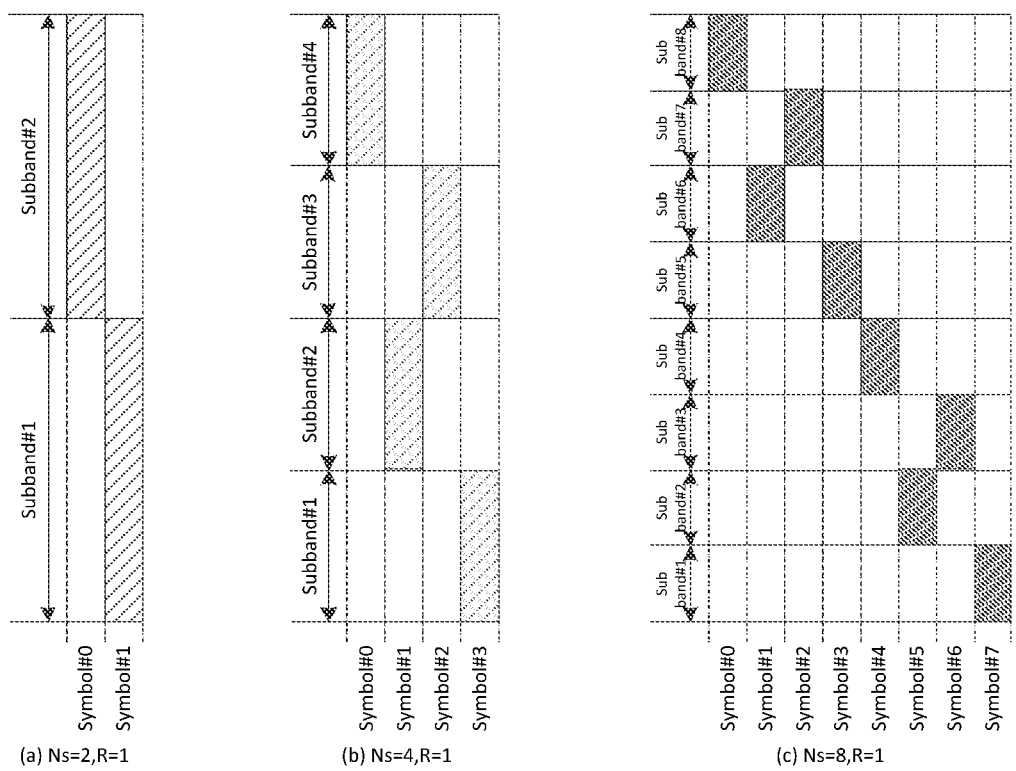
FIGS. 5(a), (b) and (c) illustrates an example of aperiodic SRS transmission according to the second embodiment.

In FIG. 5, no guard period is configured. For some UEs, a guard period of one symbol may be necessary between different hops (e.g. change from subband #2 to subband #1). The change from one subband (e.g. subband #2) to another subband (e.g. subband #1) means a frequency hop. The number of subbands (e.g. 2 subbands represented by subband #2 and subband #1) denotes the hops of frequency hopping. That is, FIG. 5(a) indicates a 2 hops frequency hopping; FIG. 5(b) indicates a 4 hops frequency hopping; and FIG. 5(c) indicates a 8 hops frequency hopping.

According to a third embodiment, a UE may be configured with 2 subbands without guard period, and a repetition R larger than 1. The number of subbands (i.e. 2 in this embodiment) is calculated by dividing "Ns" by "R". In the third embodiment, the "Ns" and "R" may be set to "Ns=4, R=2" or "Ns=6, R=3" or "Ns=8, R=4". Therefore, in the third embodiment, a 2 hop frequency hopping is configured. The full hopping bandwidth is equal to Ns/R (i.e. 2=the number of hops) times the bandwidth of a subband across the configured symbols. The antenna port of SRS transmission is mapped to the same subband within R adjacent symbols for repetition.

FIGS. 6(a), (b) and (c) illustrates an example of the aperiodic SRS transmission according to the third embodiment, in which FIG. 6(a) indicates Ns=4 and R=2; FIG. 6(b) indicates Ns=6 and R=3; and FIG. 6(c) indicates Ns=8 and R=4.

As shown in FIG. 6(a), at symbol #0, SRS is transmitted in subband #2; and at symbol #1, SRS is repeatedly transmitted in subband #2. That is, the antenna port of SRS transmission is mapped to the same subband #2 within 2 adjacent symbols for repetition (i.e. symbol #0 and symbol #1). At symbol #2, SRS is transmitted in subband #1; and at symbol #3, SRS is repeatedly transmitted in subband #1. That is, the antenna port of SRS transmission is mapped to the same subband #1 within 2 adjacent symbols for repetition (i.e. symbol #2 and symbol #3).

In FIG. 6(b), SRS is repeatedly transmitted three times in subband #2 at symbol #0, symbol #1 and symbol #2, in which the antenna port of SRS transmission is mapped to the same subband #2 within 3 adjacent symbols for repetition (i.e. symbol #0, symbol #1 and symbol #2); and SRS is repeatedly transmitted three times in subband #1 at symbol #3, symbol #4 and symbol #5.

In FIG. 6(c), SRS is repeatedly transmitted four times in subband #2 at symbol #0, symbol #1, symbol #2 and symbol #3, in which the antenna port of SRS transmission is mapped to the same subband #2 within 4 adjacent symbols for repetition (i.e. symbol #0, symbol #1, symbol #2 and symbol #3); and SRS is repeatedly transmitted four times in subband #1 at symbol #4, symbol #5, symbol #6 and symbol #7.

In FIGS. 6(a), (b) and (c), the start symbol of the SRS transmission is configured to symbol #0. For Ns=4 and R=2 shown in FIG. 6(a), the start symbol of the SRS transmission may be alternatively configured to symbol #1, symbol #2, symbol #3, symbol #4, symbol #5, symbol #6, symbol #7, symbol #8, symbol #9 or symbol #10. For Ns=6 and R=3 shown in FIG. 6(b), the start symbol of the SRS transmission may be alternatively configured to symbol #1, symbol #2, symbol #3, symbol #4, symbol #5, symbol #6, symbol #7 or symbol #8. For Ns=8 and R=4 shown in FIG. 6(c), the start symbol of the SRS transmission may be alternatively configured to symbol #1, symbol #2, symbol #3, symbol #4, symbol #5 or symbol #6.

Figure 6:
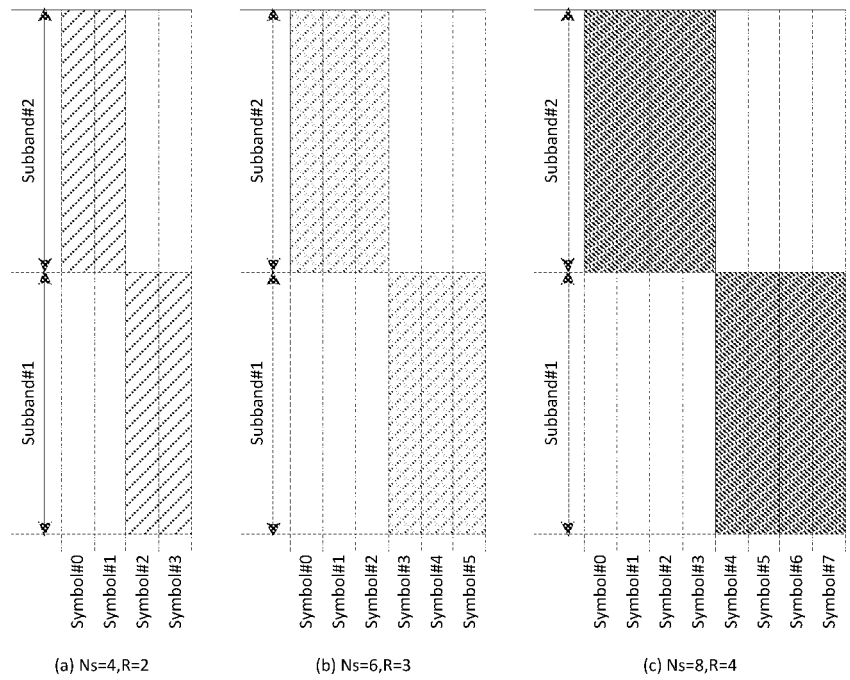
FIGS. 6(a), (b) and (c) illustrates an example of the aperiodic SRS transmission according to the third embodiment.

In FIG. 6, no guard period is configured. In a variation of the third embodiment, a one-symbol guard period may be configured when the subband changes (e.g. change from subband #2 to subband ##0. In this condition, if Ns is 4, then Nst is 5 in view of a one-symbol guard period, and the start symbol of the SRS transmission may be configured to symbol #0, symbol #1, symbol #2, symbol #3, symbol #4, symbol #5, symbol #6, symbol #7, symbol #8 or symbol #9. If Ns is 6, then Nst is 7 in view of a one-symbol guard period, and the start symbol of the SRS transmission may be configured to symbol #0, symbol #1, symbol #2, symbol #3, symbol #4, symbol #5, symbol #6 or symbol #7. If Ns is 8, then Nst is 9 in view of a one-symbol guard period, and the start symbol of the SRS transmission may be configured to symbol #0, symbol #1, symbol #2, symbol #3, symbol #4 or symbol #5.

According to a fourth embodiment, a UE may be configured with both frequency hopping and repetition for one SRS transmission in one subframe without guard period. For the same "Nst" (or same Ns), different "R" may be configured, which leads to different frequency hopping numbers.

Figure 7:
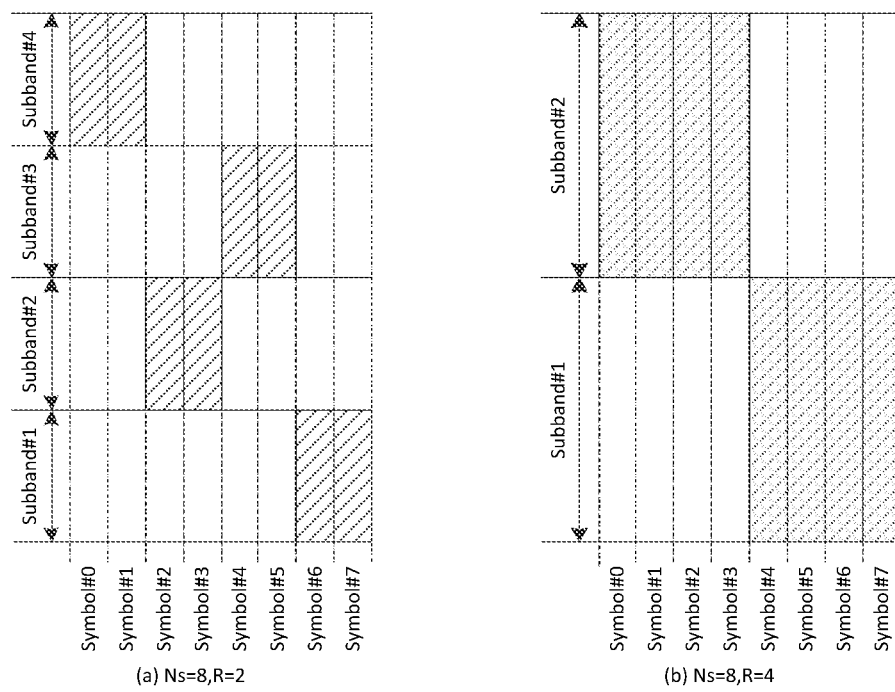
FIGS. 7(a) and (b) illustrates an example of the aperiodic SRS transmission according to the fourth embodiment.

FIGS. 7(a) and (b) illustrates an example of the aperiodic SRS transmission according to the fourth embodiment, in which FIG. 7(a) indicates Nst=Ns=8 (Nst=Ns implies no guard period), R=2 (i.e. 2 times repetition and 4 (=Ns/R=8/2) hops frequency hopping); and FIG. 7(b) indicates Nst=Ns=8, R=4 (i.e. 4 times repetition and 2 (=8/4) hops frequency hopping).

As shown in FIG. 7(a), at symbol #0, SRS is transmitted in subband #4; and at symbol #1, SRS is repeatedly transmitted in subband #4. That is, the antenna port of SRS transmission is mapped to the same subband #4 within 2 adjacent symbols for repetition (i.e. symbol #0 and symbol #1). At symbol #2, SRS is transmitted in subband #2; and at symbol #3, SRS is repeatedly transmitted in subband #2. At symbol #4, SRS is transmitted in subband #3; and at symbol #5, SRS is repeatedly transmitted in subband #3. At symbol #6, SRS is transmitted in subband #1; and at symbol #7, SRS is repeatedly transmitted in subband #1.

In FIG. 7(b), SRS is repeatedly transmitted four times in subband #2 at symbol #0, symbol #1, symbol #2 and symbol #3. That is, the antenna port of SRS transmission is mapped to the same subband #2 within 4 adjacent symbols for repetition (i.e. symbol #0, symbol #1, symbol #2 and symbol #3). In addition, SRS is repeatedly transmitted four times in subband #1 at symbol #4, symbol #5, symbol #6 and symbol #7.

According to the second to the fourth embodiments, the frequency hopping is intra-subframe frequency hopping (i.e. the frequency hopping is performed within one subframe). According to a fifth embodiment, the frequency hopping is both intra-subframe and inter-subframe (i.e. the frequency hopping is performed across more than one subframe). A UE may be configured with Nst=Ns=2 or 4 or 8 symbol periodic SRS with intra-subframe and inter-subframe hopping, and a repetition R larger than 1, where since more than one subframe is configured for inter-subframe frequency hopping, Nst denotes the number of configured adjacent SRS symbols in one configured subframe while Ns denotes the number of configured SRS symbols for actually transmitting SRS in one configured subframe. The number of subbands is calculated by multiplying "Ns" with the number of Configured Subframes (referred to as "CS") for one full band sounding and dividing the result by "R" (i.e. Ns*CS/R). The antenna port of SRS transmission is mapped to the same subband within R adjacent symbols for repetition. The SRS transmission may occupy the same symbol location(s) in each subframe (e.g. each of two subframes).

Figure 8:
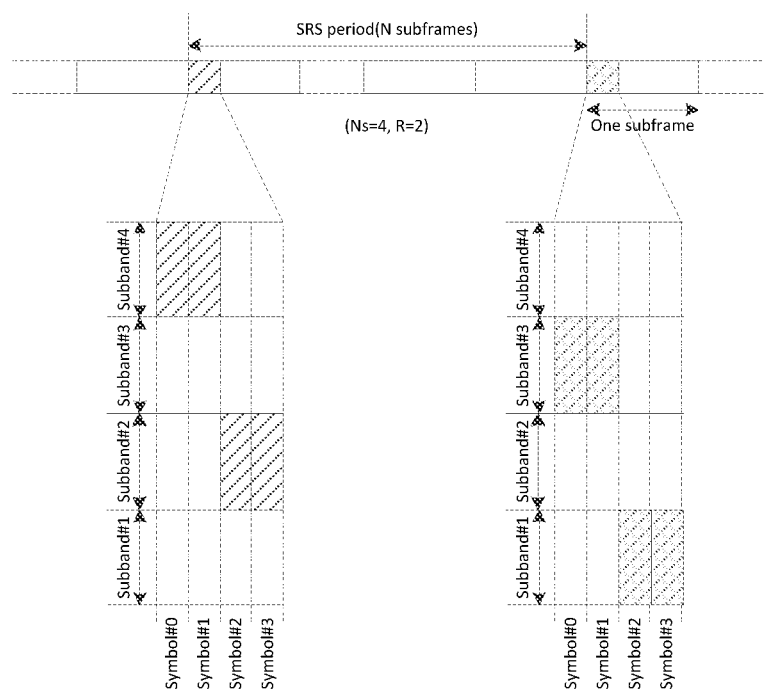
FIG. 8 illustrates a periodic SRS transmission according to the fifth embodiment.

FIG. 8 illustrates a periodic SRS transmission according to the fifth embodiment, in which Nst=Ns=4 and R=2, and the configured subframes (CS) for one full band sounding are 2. As shown in FIG. 8, at symbol #0 of the first configured subframe, SRS is transmitted in subband #4; and at symbol #1 of the first configured subframe, SRS is repeatedly transmitted in subband #4. At symbol #2 of the first configured subframe, SRS is transmitted in subband #2; and at symbol #3 of the first configured subframe, SRS is repeatedly transmitted in subband #2. At symbol #0 of the second configured subframe, SRS is transmitted in subband #3; and at symbol #1 of the second configured subframe, SRS is repeatedly transmitted in subband #3. At symbol #2 of the second configured subframe, SRS is transmitted in subband #1; and at symbol #3 of the second configured subframe, SRS is repeatedly transmitted in subband #1.

It can be seen from FIG. 8 that the same symbol locations (i.e. symbol #0 to symbol #3) are occupied in each of the two configured subframes. In the same subframe, the SRS is transmitted in two different subbands (e.g. subband #2 and subband #4 in the first configured subframe, and subband #1 and subband #3 in the second configured subframe). In addition, the antenna port of SRS transmission is mapped to the same subband #4 within R (=2) adjacent symbols for repetition (i.e. symbol #0 and symbol #1 of the first configured subframe), to the same subband #2 within R (=2) adjacent symbols for repetition (i.e. symbol #2 and symbol #3 of the first configured subframe), to the same subband #3 within R (=2) adjacent symbols for repetition (i.e. symbol #0 and symbol #1 of the second configured subframe), to the same subband #1 within R (=2) adjacent symbols for repetition (i.e. symbol #2 and symbol #3 of the second configured subframe).

FIG. 8 shows that the start symbol of the SRS transmission is symbol #0. In the condition of Nst=Ns=2, the start symbol of the SRS transmission may be alternatively configured to symbol #1, symbol #2, symbol #3, symbol #4, symbol #5, symbol #6, symbol #7, symbol #8, symbol #9, symbol #10, symbol #11 or symbol #12. In the condition of Nst=Ns=4, the start symbol of the SRS transmission may be alternatively configured to symbol #1, symbol #2, symbol #3, symbol #4, symbol #5, symbol #6, symbol #7, symbol #8, symbol #9 or symbol #10. Further, if a guard period is configured for each hop of frequency hopping, in the condition of Nst=3 and Ns=2, the start symbol of the SRS transmission may be alternatively configured to symbol #1, symbol #2, symbol #3, symbol #4, symbol #5, symbol #6, symbol #7, symbol #8, symbol #9, symbol #10 or symbol #11; while in the condition of Nst=5 and Ns=4, the start symbol of the SRS transmission may be alternatively configured to symbol #1, symbol #2, symbol #3, symbol #4, symbol #5, symbol #6, symbol #7, symbol #8 or symbol #9.

According to a sixth embodiment, the frequency hopping is inter-subframe. A UE may be configured with Nst=Ns=R with inter-subframe hopping and intra-subframe repetition. The SRS occupies the same symbol location(s) in each subframe (e.g. each of two subframes). As Ns is equal to R, the number of subbands is equal to the number of subframes to be configured. The antenna port of SRS transmission is mapped to the same subband within the adjacent symbols for repetition.

Figure 9:
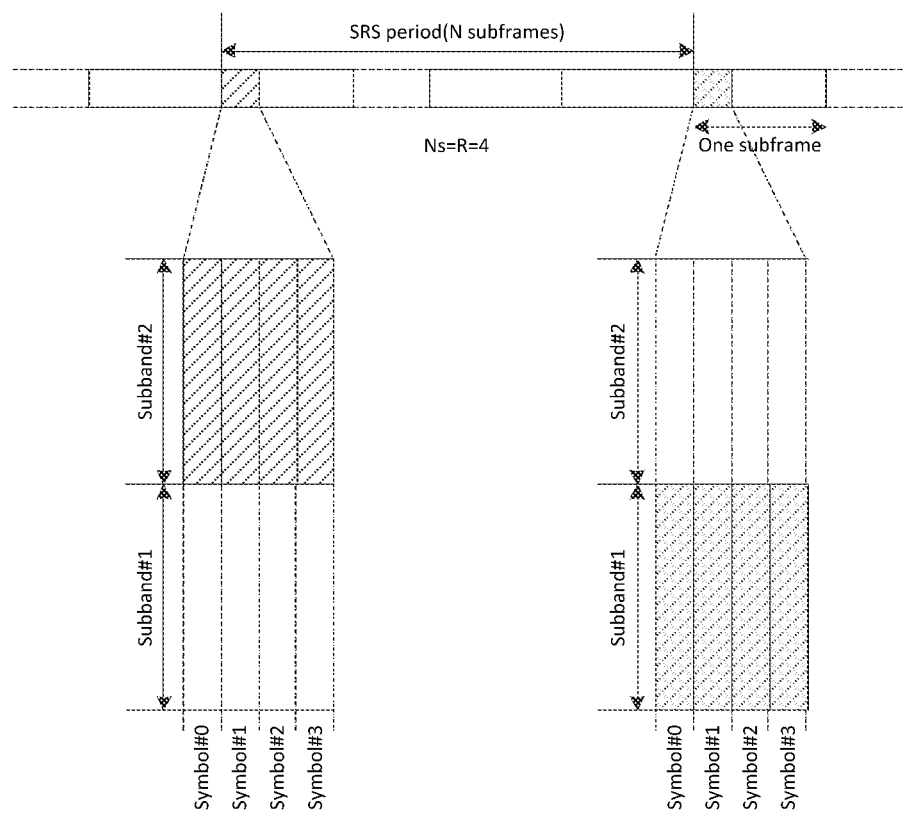
FIG. 9 illustrates a periodic SRS transmission according to the sixth embodiment.

FIG. 9 illustrates the periodic SRS transmission according to the sixth embodiment, in which Nst=Ns=R=4, and the configured subframes are 2.

As shown in FIG. 9, SRS is repeatedly transmitted four times in subband #2 at symbol #0, symbol #1, symbol #2 and symbol #3 of the first configured subframe; and then, SRS is repeatedly transmitted four times in subband #1 at symbol #0, symbol #1, symbol #2 and symbol #3 of the second configured subframe.

The above disclosure of embodiments 1-6 with reference to at least FIGS. 5-9 only describes one antenna port being used for transmitting SRS. Alternatively, if more than one antenna port can be used to simultaneously perform transmissions (e.g. of SRS), the aforementioned "antenna port" may apply to "each of antenna ports", wherein the antenna ports may simultaneously perform transmission.

In the following embodiments, multiple antenna ports (that may or may NOT simultaneously perform transmission) may be used for transmitting SRS. For example, a UE may have a capability of xTyR (e.g. 1T2R, 2T4R, 1T4R, etc), in which y represents the number of antenna ports (or antenna ports that can be simultaneously used for receiving), and x denotes the number of antenna ports that can be simultaneously used for transmitting.

According to a seventh embodiment, a UE with 1T2R or 2T4R capability may be configured with intra-subframe antenna switching and intra-subframe frequency hopping and/or repetition. No guard period is configured. Ns (=Nst) may be configured as 4 or 8 for aperiodic SRS transmission. The number of subbands is calculated by (Ns/R)/(y/x). According to the seventh embodiment, y=2 and x=1 (i.e. 1T2R) or y=4 and x=2 (i.e. 2T4R). The full hopping bandwidth is (Ns/R)/(y/x) times of bandwidth of a subband across the configured symbols, assuming that the bandwidth of each subband is the same. Different antenna ports (i.e. those antenna ports that can NOT perform transmission simultaneously) for SRS transmission are mapped to different symbols.

Figure 10:
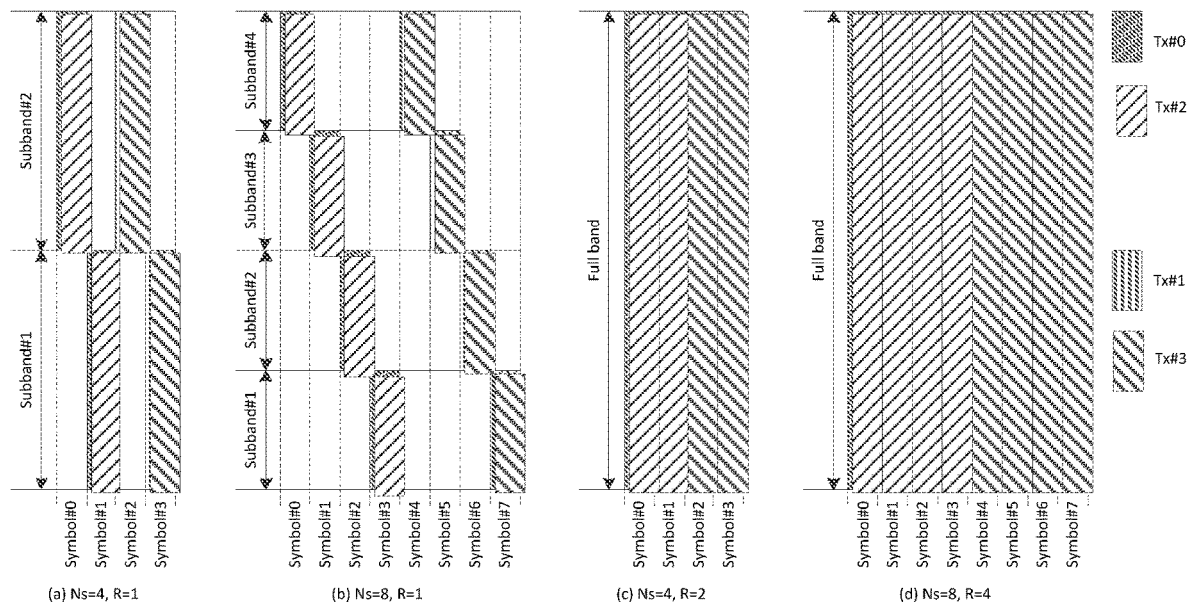
FIGS. 10(a), (b), (c) and (d) illustrates the aperiodic SRS transmission for a UE with 2T4R according to the seventh embodiment.

FIGS. 10(a), (b), (c) and (d) illustrates the aperiodic SRS transmission for a UE with 2T4R according to the seventh embodiment, in which FIG. 10(a) indicates Nst=Ns=4 and R=1 with intra-subframe antenna switching and intra-subframe frequency hopping but without repetition (i.e. R=1); FIG. 10(b) indicates Nst=Ns=8 and R=1 with intra-subframe antenna switching and intra-subframe frequency hopping but without repetition; FIG. 10(c) indicates Nst=Ns=4 and R=2 with intra-subframe antenna switching and repetition but without frequency hopping; and FIG. 10(d) indicates Nst=Ns=8 and R=2 with intra-subframe antenna switching and repetition but without frequency hopping.

As shown in FIG. 10(a), at symbol #0, antenna port 0, i.e. Tx #0, and antenna port 2, i.e. Tx #2 (that can perform transmission simultaneously) are used for transmitting SRS in subband #2. At symbol #1, antenna port 0 and antenna port 2 are used for transmitting SRS in subband #1 (i.e. frequency hopping from subband #2 to subband #1 for antenna port 0 and antenna port 2). At symbol #2, antenna port 1, i.e. Tx #1, and antenna port 3, i.e. Tx #3 (that can perform transmission simultaneously) are used for transmitting SRS in subband #2 (i.e. antenna switching from antenna port 0 and antenna port 2 (that can perform transmission simultaneously) to antenna port 1 and antenna port 3 (perform transmission simultaneously)). In particular, antenna ports 0 and 2 can NOT perform transmission simultaneously with antenna ports 1 and 3. At symbol #3, antenna port 1 and antenna port 3 are used for transmitting SRS in subband #1 (i.e. frequency hopping from subband #2 to subband #1 for antenna port 1 and antenna port 3). Antenna port 0 and antenna port 2 are mapped to symbol #0 and symbol #1, which are different from symbol #2 and symbol #3 mapped by antenna port 1 and antenna port 3.

As shown in FIG. 10(b), antenna port 0 and antenna port 2 are used for transmitting SRS in subband #4 at symbol #0, in subband #3 at symbol #1, in subband #2 at symbol #2 and in subband #1 at symbol #3; while antenna port 1 and antenna port 3 are used for transmitting SRS in subband #4 at symbol #4, in subband #3 at symbol #5, in subband #2 at symbol #6 and in subband #1 at symbol #7.

As shown in FIG. 10(c), antenna port 0 and antenna port 2 are used for transmitting SRS in full band at symbol #0 and symbol #1, while antenna port 1 and antenna port 3 are used for transmitting SRS in full band at symbol #2 and symbol #3.

As shown in FIG. 10(d), antenna port 0 and antenna port 2 are used for transmitting SRS in full band at symbol #0, symbol #1, symbol #2 and symbol #3 while antenna port 1 and antenna port 3 are used for transmitting SRS in full band at symbol #4, symbol #5, symbol #6 and symbol #7.

According to an eighth embodiment, a UE with 1T2R or 2T4R capability may be configured with intra-subframe antenna switching and intra-subframe frequency hopping and/or repetition, in which a one-symbol guard period is added when antenna switching occurs. The eighth embodiment differs from the seventh embodiment in the one-symbol guard period.

Figure 11:
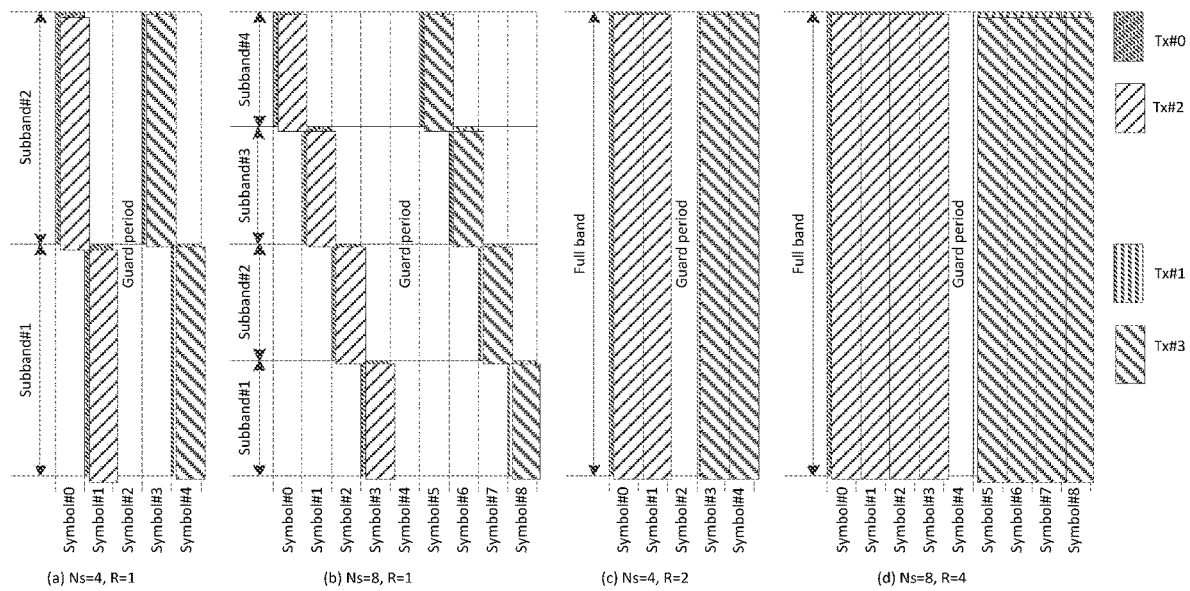
FIGS. 11(a), (b), (c) and (d) illustrates the aperiodic SRS transmission for a UE with 2T4R according to the eighth embodiment.

FIGS. 11(a), (b), (c) and (d) illustrates the aperiodic SRS transmission for a UE with 2T4R according to the eighth embodiment, in which FIG. 11(a) indicates Ns=4 (Nst=5, with one antenna switching with a one-symbol guard period) and R=1 with intra-subframe antenna switching and intra-subframe frequency hopping but without repetition (i.e. R=1); FIG. 11(b) indicates Ns=8 (Nst=9, with one antenna switching with a one-symbol guard period) and R=1 with intra-subframe antenna switching and intra-subframe frequency hopping but without repetition; FIG. 11(c) indicates Ns=4 (Nst=5, with one antenna switching with a one-symbol guard period) and R=2 with intra-subframe antenna switching and repetition but without frequency hopping; and FIG. 11(d) indicates Ns=8 (Nst=9, with one antenna switching with a one-symbol guard period) and R=2 with intra-subframe antenna switching and repetition but without frequency hopping.

As shown in FIG. 11(a), at symbol #0, antenna port 0, i.e. Tx #0, and antenna port 2, i.e. Tx #2, are used for transmitting SRS in subband #2. At symbol #1, antenna port 0 and antenna port 2 are used for transmitting SRS in subband #1 (i.e. frequency hopping from subband #2 to subband #1 for antenna port 0 and antenna port 2). At symbol #2, a one-symbol guard period is added when the antenna ports switch from antenna port 0 and antenna port 2 to antenna port 1, i.e. Tx #1 and antenna port 3, i.e. Tx #3. At symbol #3, antenna port 1 and antenna port 3 are used for transmitting SRS in subband #2. At symbol #4, antenna port 1 and antenna port 3 are used for transmitting SRS in subband #1 (i.e. frequency hopping from subband #2 to subband #1 for antenna port 1 and antenna port 3). Antenna port 0 and antenna port 2 are mapped to symbol #0 and symbol #1, which are different from symbol #3 and symbol #4 mapped by antenna port 1 and antenna port 3.

As shown in FIG. 11(b), antenna port 0 and antenna port 2 are used for transmitting SRS in subband #4 at symbol #0, in subband #3 at symbol #1, in subband #2 at symbol #2 and in subband #1 at symbol #3. At symbol #4, a one-symbol guard period is added when the antenna ports switch from antenna port 0 and antenna port 2 to antenna port 1 and antenna port 3. The antenna port 1 and antenna port 3 are used for transmitting SRS in subband #4 at symbol #5, in subband #3 at symbol #6, in subband #2 at symbol #7 and in subband #1 at symbol #8.

As shown in FIG. 11(c), antenna port 0 and antenna port 2 are used for transmitting SRS in full band at symbol #0 and symbol #1. At symbol #2, a one-symbol guard period is added when the antenna ports switch from antenna port 0 and antenna port 2 to antenna port 1 and antenna port 3. The antenna port 1 and antenna port 3 are used for transmitting SRS in full band at symbol #3 and symbol #4.

As shown in FIG. 11(d), antenna port 0 and antenna port 2 are used for transmitting SRS in full band at symbol #0, symbol #1, symbol #2 and symbol #3. At symbol #4, a one-symbol guard period is added when the antenna ports switch from antenna port 0 and antenna port 2 to antenna port 1 and antenna port 3. The antenna port 1 and antenna port 3 are used for transmitting SRS in full band at symbol #5, symbol #6, symbol #7 and symbol #8.

According to a ninth embodiment, a UE with 1T4R capability may be configured with intra-subframe frequency hopping and antenna switching among one or two subframes without guard period. The number of subbands is calculated by (Ns*CS/R)/(y/x), in which y denotes the number of antenna ports (or antenna ports that can be simultaneously used for receiving), x denotes the number of antenna ports that can be simultaneously used for transmitting, and CS denotes the number of configured subframes for one full band sounding. According to the ninth embodiment, y=4 and x=1 (i.e. 1T4R). The full hopping bandwidth is (Ns*CS/R)/(y/x) times of bandwidth of a subband across the configured symbols, assuming that the bandwidth of each subband is the same and that the same number of symbols are configured for each subframe. Each antenna port in a subframe is mapped in (Ns*CS)/(y/x) adjacent symbols. Different antenna ports used for SRS transmission are mapped to different symbols. For example, Ns=Nst may be configured to 8, with one or two configured subframes (CS=1 or 2) for aperiodic SRS transmission.

If each of the plurality of subframes is configured with different symbols to be used for SRS, the number of subbands may be calculated by (Ns-total/R)/(y/x), in which "Ns-total" represents the total number of symbols used for actually transmitting SRS contained in all of the configured subframes. Each antenna port in a subframe is mapped in Ns-total/2 adjacent symbols. Incidentally, "Nst-total" may represents the total number of configured symbols contained in all of the configured subframes, which is equal to "Ns-total" plus the number of symbols used for guard period.

Figure 12:
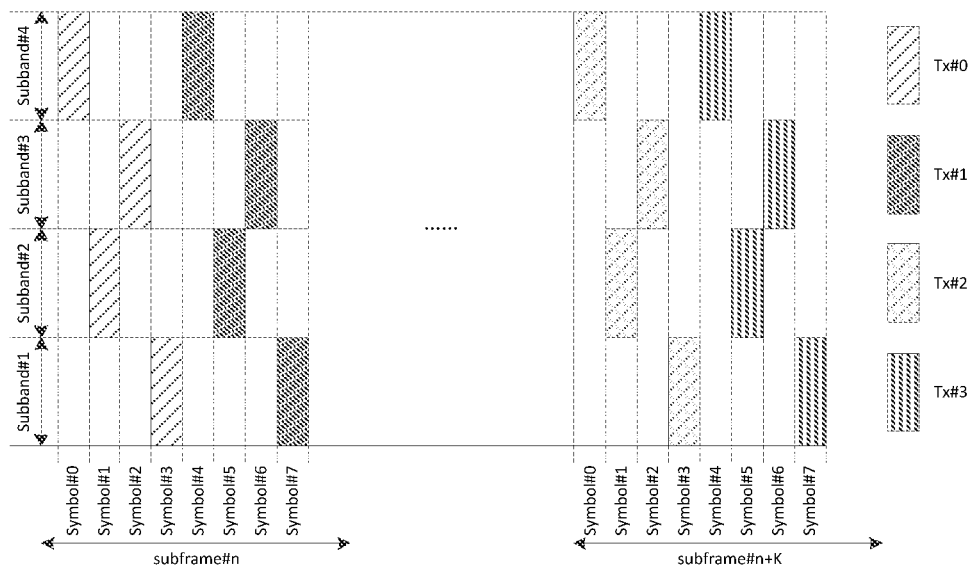
FIG. 12 illustrates the aperiodic SRS transmission for a UE with 1T4R according to the ninth embodiment.

FIG. 12 illustrates the aperiodic SRS transmission for a UE with 1T4R according to the ninth embodiment, in which Ns=Nst=8 and CS=2 (or Ns-total=Nst-total=16 and CS=2) and R=1.

As shown in FIG. 12, antenna port 0, i.e., Tx #0, is used to transmit SRS at symbol #0 of the first configured subframe in subband #4, at symbol #1 of the first configured subframe in subband #2 after frequency hopping from subband #4 to subband #2, at symbol #2 of the first configured subframe in subband #3 after frequency hopping from subband #2 to subband #3 and at symbol #3 of the first configured subframe in subband #1 after frequency hopping from subband #3 to subband #1. Antenna port 1, i.e., Tx #1, is used to transmit SRS at symbol #4 of the first configured subframe in subband #4, at symbol #5 of the first configured subframe in subband #2 after frequency hopping from subband #4 to subband #2, at symbol #6 of the first configured subframe in subband #3 after frequency hopping from subband #2 to subband #3 and at symbol #7 of the first configured subframe in subband #1 after frequency hopping from subband #3 to subband #1. Antenna port 2, i.e., Tx #2, is used to transmit SRS at symbol #0 of the second configured subframe in subband #4, at symbol #1 of the second configured subframe in subband #2 after frequency hopping from subband #4 to subband #2, at symbol #2 of the second configured subframe in subband #3 after frequency hopping from subband #2 to subband #3 and at symbol #3 of the second configured subframe in subband #1 (frequency hopping from subband #3 to subband #1). Antenna port 3, i.e., Tx #3, is used to transmit SRS at symbol #4 of the second configured subframe in subband #4, at symbol #5 of the second configured subframe in subband #2 after frequency hopping from subband #4 to subband #2, at symbol #6 of the second configured subframe in subband #3 after frequency hopping from subband #2 to subband #3 and at symbol #7 of the second configured subframe in subband #1 after frequency hopping from subband #3 to subband #1.

As shown in FIG. 12, in the ninth embodiment, the antenna port 0 and antenna port 1 are used for transmitting SRS in the first configured subframe, and the antenna port 2 and antenna port 3 are used for transmitting SRS in the second configured subframe. According to a tenth embodiment, the antenna port 0 is used for transmitting SRS in the first configured subframe, and the antenna port 1, antenna port 2 and antenna port 3 are used for transmitting SRS in the second configured subframe.

Figure 13:
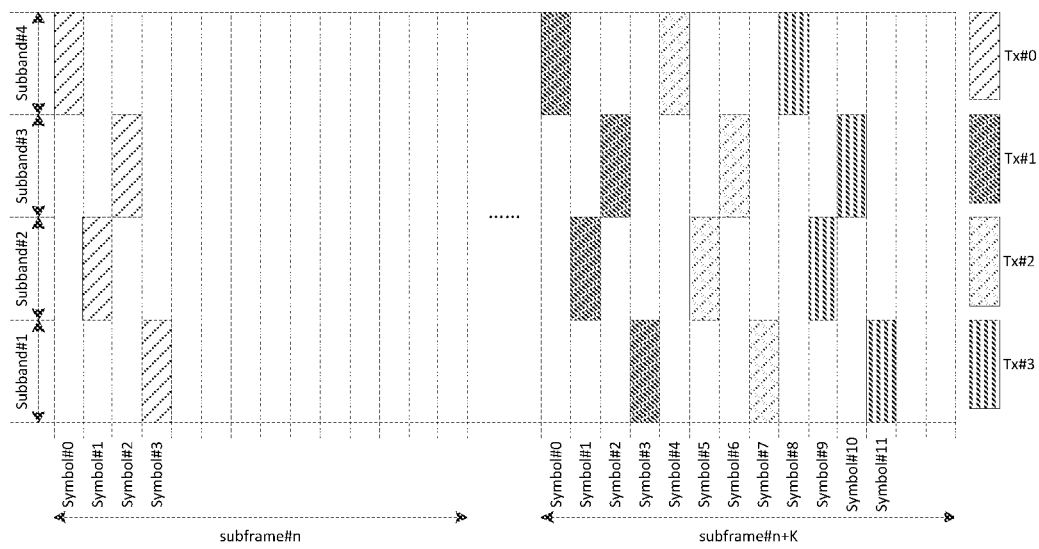
FIG. 13 illustrates the aperiodic SRS transmission for a UE with 1T4R according to the tenth embodiment.

FIG. 13 illustrates the aperiodic SRS transmission for a UE with 1T4R according to the tenth embodiment, in which the total configured symbols Ns-total=Nst-total=16 (CS=2, in the first configured subframe, Ns=Nst=4, and in the second configured subframe, Ns=Nst=12) and R=1.

As shown in FIG. 13, antenna port 0, i.e., Tx #0, is used to transmit SRS at symbol #0 of the first configured subframe in subband #4, at symbol #1 of the first configured subframe in subband #2, at symbol #2 of the first configured subframe in subband #3 and at symbol #3 of the first configured subframe in subband #1. Antenna port 1, i.e., Tx #1, is used to transmit SRS at symbol #0 of the second configured subframe in subband #4, at symbol #1 of the second configured subframe in subband #2, at symbol #2 of the second configured subframe in subband #3 and at symbol #3 of the second configured subframe in subband #1. Antenna port 2, i.e., Tx #2, is used to transmit SRS at symbol #4 of the second configured subframe in subband #4, at symbol #5 of the second configured subframe in subband #2, at symbol #6 of the second configured subframe in subband #3 and at symbol #7 of the second configured subframe in subband #1. Antenna port 3, i.e., Tx #3, is used to transmit SRS at symbol #8 of the second configured subframe in subband #4, at symbol #9 of the second configured subframe in subband #2, at symbol #10 of the second configured subframe in subband #3 and at symbol #11 of the second configured subframe in subband #1.

In the tenth embodiment, one antenna port is used to transmit SRS in the first configured subframe and three antenna ports are used to transmit SRS in the second configured subframe. Alternatively, three antenna ports may be used to transmit SRS in the first configured subframe and one antenna port may be used to transmit SRS in the second configured subframe.

In the ninth embodiment and the tenth embodiment, no guard period is configured when antenna switching occurs. According to an eleventh embodiment, a UE with 1T4R capability may be configured with intra-subframe frequency hopping and antenna switching among one or two subframes with one-symbol guard period. Similar to the ninth and the tenth embodiments, the number of subbands is calculated by (Ns-total/R)/(y/x). For example, if 2 subbands (i.e. 2 hops frequency hopping) are configured, Ns-total=8 and Nst-total=11 (i.e. three one-symbol guard periods are configured for three antenna switching within one subframe). For another example, if 4 subbands (i.e. 4 hops frequency hopping) are configured, Ns-total=16 and Nst-total=18 (i.e. one one-symbol guard period is configured for one antenna switching within each of two configured subframes).

Figure 14:
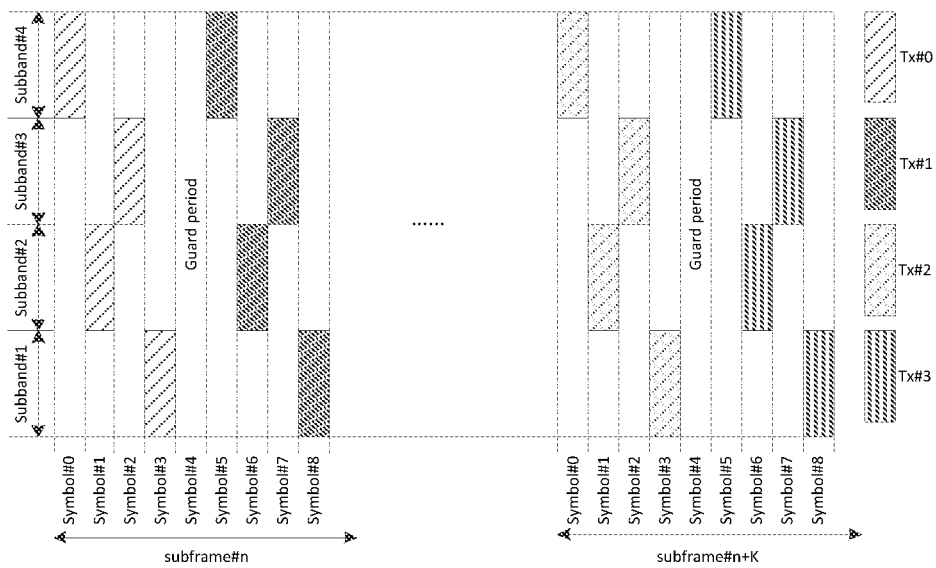
FIG. 14 illustrates the aperiodic SRS transmission for a UE with 1T4R according to the eleventh embodiment.

FIG. 14 illustrates the aperiodic SRS transmission for a UE with 1T4R according to the eleventh embodiment, in which Ns=8 and Nst=9 and CS=2 (or Ns-total=16 and Nst-total=18 and CS=2) and R=1.

As shown in FIG. 14, antenna port 0, i.e., Tx #0, is used to transmit SRS at symbol #0 of the first configured subframe in subband #4, at symbol #1 of the first configured subframe in subband #2, at symbol #2 of the first configured subframe in subband #3, at symbol #3 of the first configured subframe in subband #1. A one-symbol guard period is added at symbol #4 of the first configured subframe (antenna switching from antenna port 0 to antenna port 1). Antenna port 1, i.e., Tx #1, is used to transmit SRS at symbol #5 of the first configured subframe in subband #4, at symbol #6 of the first configured subframe in subband #2, at symbol #7 of the first configured subframe in subband #3, at symbol #8 of the first configured subframe in subband #1. Antenna port 2, i.e., Tx #2, is used to transmit SRS at symbol #0 of the second configured subframe in subband #4, at symbol #1 of the second configured subframe in subband #2, at symbol #2 of the second configured subframe in subband #3, at symbol #3 of the second configured subframe in subband #1. A one-symbol guard period is added at symbol #4 of the second configured subframe (antenna switching from antenna port 2 to antenna port 3). Antenna port 3, i.e., Tx #3, is used to transmit SRS at symbol #5 of the second configured subframe in subband #4, at symbol #6 of the second configured subframe in subband #2, at symbol #7 of the second configured subframe in subband #3, at symbol #8 of the second configured subframe in subband #1.

As shown in FIG. 14, in the eleventh embodiment, the antenna port 0 and antenna port 1 are used for transmitting SRS in the first configured subframe, and the antenna port 2 and antenna port 3 are used for transmitting SRS in the second configured subframe. According to a twelfth embodiment, the antenna port 0 is used for transmitting SRS in the first configured subframe, and the antenna ports 1, 2 and 3 are used for transmitting SRS in the second configured subframe.

Figure 15:
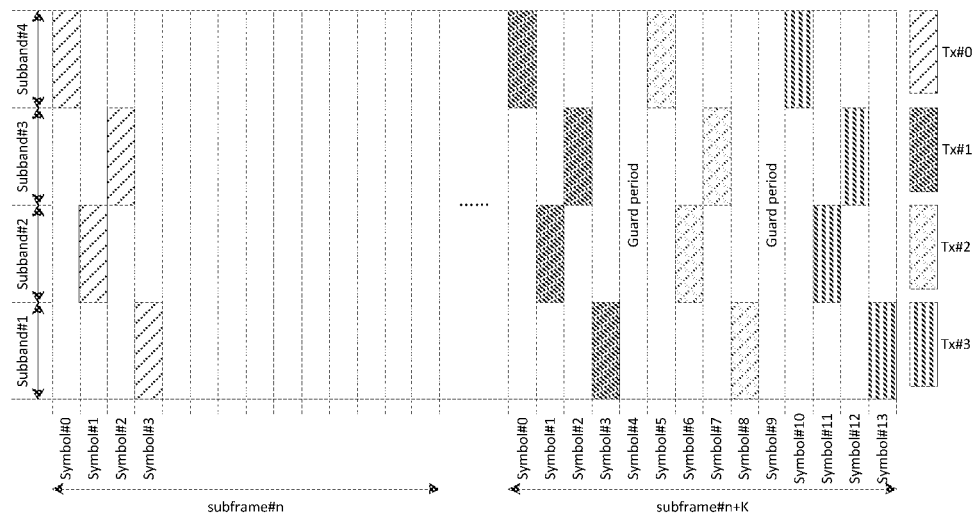
FIG. 15 illustrates the aperiodic SRS transmission for a UE with 1T4R according to the twelfth embodiment.

FIG. 15 illustrates the aperiodic SRS transmission for a UE with 1T4R according to the twelfth embodiment, in which Ns-total=16 and Nst-total=18 (CS=2, in the first configured subframe, Ns=Nst=4 without guard period, and in the second configured subframe, Ns=12 and Nst=14 with two one-symbol guard periods) and R=1.

As shown in FIG. 15, antenna port 0, i.e., Tx #0, is used to transmit SRS at symbol #0 of the first configured subframe in subband #4, at symbol #1 of the first configured subframe in subband #2, at symbol #2 of the first configured subframe in subband #3, at symbol #3 of the first configured subframe in subband #1. Antenna port 1, i.e., Tx #1, is used to transmit SRS at symbol #0 of the second configured subframe in subband #4, at symbol #1 of the second configured subframe in subband #2, at symbol #2 of the second configured subframe in subband #3, at symbol #3 of the second configured subframe in subband #1. A one-symbol guard period is added at symbol #4 of the second configured subframe (antenna switching from antenna port 1 to antenna port 2). Antenna port 2, i.e., Tx #2, is used to transmit SRS at symbol #5 of the second configured subframe in subband #4, at symbol #6 of the second configured subframe in subband #2, at symbol #7 of the second configured subframe in subband #3, at symbol #8 of the second configured subframe in subband #1. A one-symbol guard period is added at symbol #9 of the second configured subframe (antenna switching from antenna port 2 to antenna port 3). Antenna port 3, i.e., Tx #3, is used to transmit SRS at symbol #10 of the second configured subframe in subband #4, at symbol #11 of the second configured subframe in subband #2, at symbol #12 of the second configured subframe in subband #3, at symbol #13 of the second configured subframe in subband #1.

In the twelfth embodiment, one antenna port is used to transmit SRS in the first configured subframe and three antenna ports are used to transmit SRS in the second configured subframe. Alternatively, three antenna ports may be used to transmit SRS in the first configured subframe and one antenna port may be used to transmit SRS in the second configured subframe.

According to a thirteenth embodiment, a UE with 1T4R capability may be configured with antenna switching among one or two subframes and repetition (e.g. R=2 or 3 or 4) with or without guard period. The number of subbands is calculated by (Ns-total/R)/(y/x), in which y denotes the number of antenna ports (or antenna ports that can be simultaneously used for receiving) while x denotes the number of antenna ports that can be simultaneously used for transmitting. According to the thirteenth embodiment, y=4 and x=1 (i.e. 1T4R). The full hopping bandwidth is (Ns-total/R)/(y/x) times of bandwidth of a subband across the configured symbols, assuming that the bandwidth of each subband is the same. In the case of (Ns-total/R)/(y/x) being equal to 1, each of the antenna ports transmits SRS in the full hopping bandwidth. Each of the antenna ports of SRS transmission is mapped to the same subband (i.e. full sounding band in this embodiment) within R adjacent symbols for repetition. Different antenna ports are mapped to different symbols.

Figure 16:
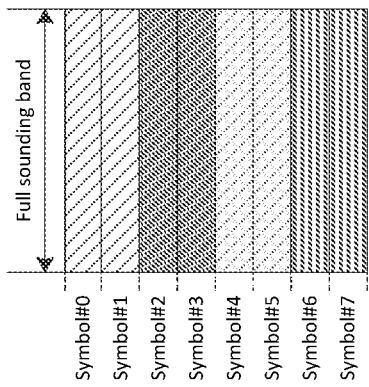
FIGS. 16(a) and (b) illustrates a first example of the aperiodic SRS transmission according to the thirteenth embodiment.
Figure 16:
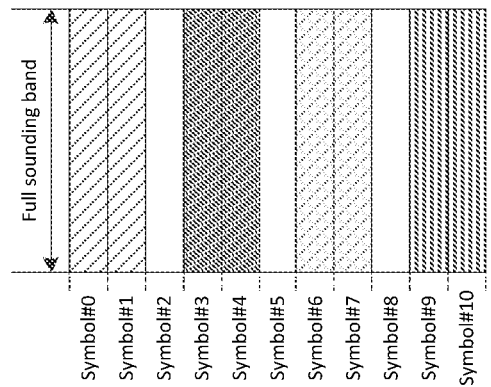
Figure 16:
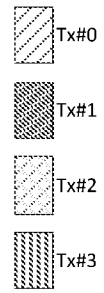

FIGS. 16(a) and (b) illustrates a first example of the aperiodic SRS transmission according to the thirteenth embodiment with the repetition R=2, in which FIG. 16(a) indicates no guard period being configured with Nst-total=Ns-total=Nst=Ns=8, while FIG. 16(b) indicates one-symbol guard period being configured with Nst-total=Nst=11 and Ns-total=Ns=8.

As shown in FIG. 16(a), antenna port 0, i.e., Tx #0, is used to transmit SRS in full sounding band at symbol #0 and symbol #1; antenna port 1, i.e., Tx #1, is used to transmit SRS in full sounding band at symbol #2 and symbol #3; antenna port 2, i.e., Tx #2, is used to transmit SRS in full sounding band at symbol #4 and symbol #5; antenna port 3, i.e., Tx #3, is used to transmit SRS in full sounding band at symbol #6 and symbol #7.

As shown in FIG. 16(b), antenna port 0 is used to transmit SRS in full sounding band at symbol #0 and symbol #1. At symbol #2, a one-symbol guard period is added when the antenna port switches from antenna port 0 to antenna port 1. Antenna port 1 is used to transmit SRS in full sounding band at symbol #3 and symbol #4. At symbol #5, a one-symbol guard period is added when the antenna port switches from antenna port 1 to antenna port 2. Antenna port 2 is used to transmit SRS in full sounding band at symbol #6 and symbol #7. At symbol #8, a one-symbol guard period is added when the antenna port switches from antenna port 2 to antenna port 3. Antenna port 3 is used to transmit SRS in full sounding band at symbol #9 and symbol #10. As shown in FIG. 16(b), a total of eleven symbols (Nst-total=Nst=11) are configured for use by SRS, in which eight symbols (Ns-total=Ns=8) are used for actually transmitting SRS while the remaining three symbols (e.g. symbol #2, symbol #5 and symbol #8) are used for guard period.

Figure 17:
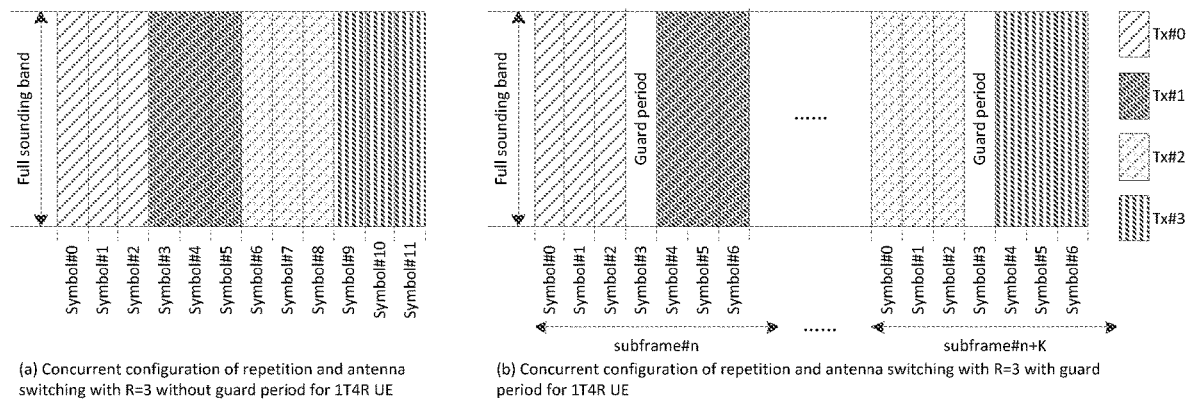
FIGS. 17(a) and (b) illustrates a second example of the aperiodic SRS transmission according to the thirteenth embodiment.

FIGS. 17(a) and (b) illustrates a second example of the aperiodic SRS transmission according to the thirteenth embodiment with the repetition R=3, in which FIG. 17(a) indicates no guard period being configured with Nst-total=Ns-total=Nst=Ns=12, while FIG. 17(b) indicates one-symbol guard period being configured with Nst-total=14 and Ns-total=12 (CS=2, Nst=7 and Ns=6 in the first configured subframe and Nst=7 and Ns=6 in the second configured subframe).

As shown in FIG. 17(a), antenna port 0, i.e., Tx #0, is used to transmit SRS in full sounding band at symbol #0, symbol #1 and symbol #2; antenna port 1, i.e., Tx #1, is used to transmit SRS in full sounding band at symbol #3, symbol #4 and symbol #5; antenna port 2, i.e., Tx #2, is used to transmit SRS in full sounding band at symbol #6, symbol #7 and symbol #8; antenna port 3, i.e., Tx #3, is used to transmit SRS in full sounding band at symbol #9, symbol #10 and symbol #11.

As shown in FIG. 17(b), antenna port 0 is used to transmit SRS in full sounding band at symbol #0, symbol #1 and symbol #2 of the first configured subframe (i.e. subframe #n). At symbol #3 of the first configured subframe, a guard period is added when the antenna port switches from antenna port 0 to antenna port 1. Antenna port 1 is used to transmit SRS in full sounding band at symbol #4, symbol #5 and symbol #6 of the first configured subframe. Antenna port 2 is used to transmit SRS in full sounding band at symbol #0, symbol #1 and symbol #2 of the second configured subframe (i.e. subframe #n+K). At symbol #3 of the second configured subframe, a guard period is added when the antenna port switches from antenna port 2 to antenna port 3. Antenna port 3 is used to transmit SRS in full sounding band at symbol #4, symbol #5 and symbol #6 of the second configured subframe. As shown in FIG. 17(b), a total of fourteen symbols (Nst-total=14) are configured for use by SRS, in which twelve symbols (Ns-total=12) are used for actually transmitting SRS while the remaining two symbols (e.g. symbol #3 of the first configured subframe and symbol #3 of the second configured subframe) are used for guard period.

Figure 18:
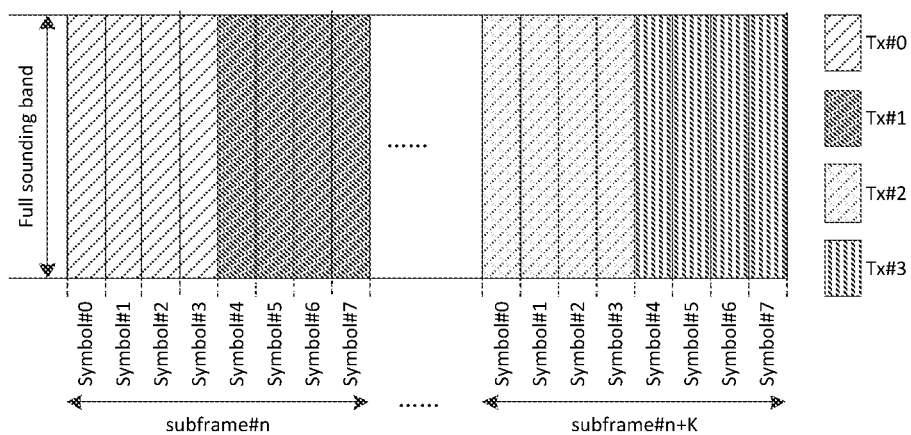
FIG. 18 illustrates a third example of the aperiodic SRS transmission according to the thirteenth embodiment.

FIG. 18 illustrates a third example of the aperiodic SRS transmission according to the thirteenth embodiment with the repetition R=4 without guard period, in which Nst-total=Ns-total=16 (CS=2, Nst=Ns=8 in both the first configured subframe and the second configured subframe).

As shown in FIG. 18, antenna port 0, i.e., Tx #0, is used to transmit SRS in full sounding band at symbol #0, symbol #1, symbol #2 and symbol #3 of the first configured subframe (i.e. subframe #n); antenna port 1, i.e., Tx #1, is used to transmit SRS in full sounding band at symbol #4, symbol #5, symbol #6 and symbol #7 of the first configured subframe; antenna port 2, i.e., Tx #2, is used to transmit SRS in full sounding band at symbol #0, symbol #1, symbol #2 and symbol #3 of the second configured subframe (i.e. subframe #n+K); antenna port 3, i.e., Tx #3, is used to transmit SRS in full sounding band at symbol #4, symbol #5, symbol #6 and symbol #7 of the second configured subframe.

Figure 19:
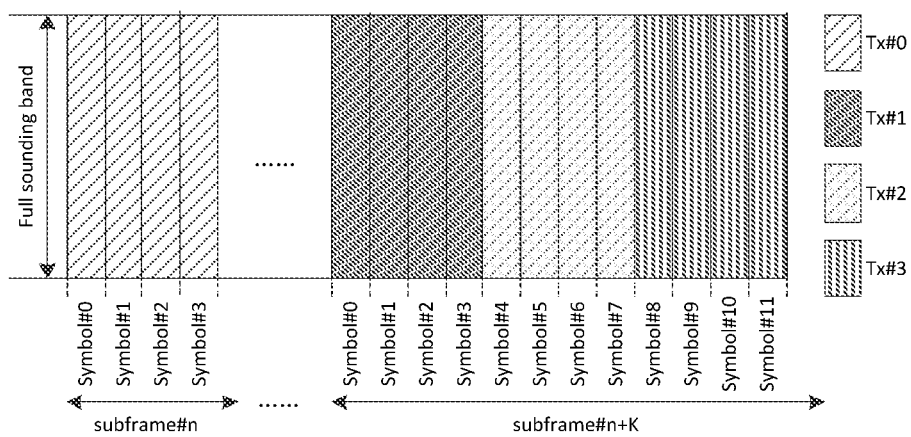
FIG. 19 illustrates a fourth example of the aperiodic SRS transmission according to the thirteenth embodiment.

FIG. 19 illustrates a fourth example of the aperiodic SRS transmission according to the thirteenth embodiment with the repetition R=4 without guard period, in which Nst-total=Ns-total=16 (CS=2, Nst=Ns=4 in the first configured subframe and Nst=Ns=12 in the second configured subframe).

As shown in FIG. 19, antenna port 0, i.e., Tx #0, is used to transmit SRS in full sounding band at symbol #0, symbol #1, symbol #2 and symbol #3 of the first configured subframe (i.e. subframe #n); antenna port 1, i.e., Tx #1, is used to transmit SRS in full sounding band at symbol #0, symbol #1, symbol #2 and symbol #3 of the second configured subframe (i.e. subframe #n+K); antenna port 2, i.e., Tx #2, is used to transmit SRS in full sounding band at symbol #4, symbol #5, symbol #6 and symbol #7 of the second configured subframe; antenna port 3, i.e., Tx #3, is used to transmit SRS in full sounding band at symbol #8, symbol #9, symbol #10 and symbol #11 of the second configured subframe.

In the fourth example of the thirteenth embodiment, one antenna port is used to transmit SRS in the first configured subframe and three antenna ports are used to transmit SRS in the second configured subframe. Alternatively, three antenna ports may be used to transmit SRS in the first configured subframe and one antenna port may be used to transmit SRS in the second configured subframe.

Figure 20:
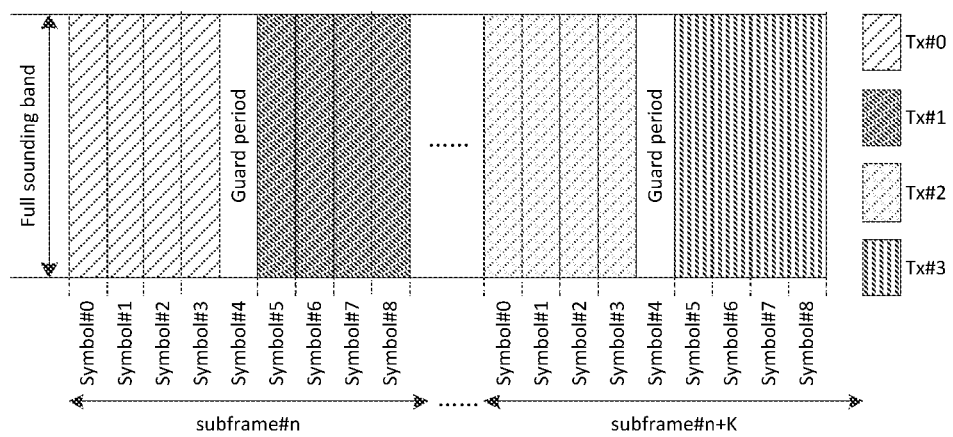
FIG. 20 illustrates a fifth example of the aperiodic SRS transmission according to the thirteenth embodiment.

FIG. 20 illustrates a fifth example of the aperiodic SRS transmission according to the thirteenth embodiment with the repetition R=4 with guard period, in which Nst-total=18 and Ns-total=16 (CS=2, Nst=9 and Ns=8 in both the first configured subframe and the second configured subframe).

As shown in FIG. 20, antenna port 0, i.e., Tx #0, is used to transmit SRS in full sounding band at symbol #0, symbol #1, symbol #2 and symbol #3 of the first configured subframe (i.e. subframe #n). At symbol #4 of the first configured subframe, a one-symbol guard period is added when the antenna port switches from antenna port 0 to antenna port 1. Antenna port 1, i.e., Tx #1, is used to transmit SRS in full sounding band at symbol #5, symbol #6, symbol #7 and symbol #8 of the first configured subframe. Antenna port 2, i.e., Tx #2, is used to transmit SRS in full sounding band at symbol #0, symbol #1, symbol #2 and symbol #3 of the second configured subframe (i.e. subframe #n+K). At symbol #4 of the second configured subframe, a one-symbol guard period is added when the antenna port switches from antenna port 2 to antenna port 3. Antenna port 3, i.e., Tx #3, is used to transmit SRS in full sounding band at symbol #5, symbol #6, symbol #7 and symbol #8 of the second configured subframe. As shown in FIG. 20, a total of eighteen symbols (Nst-total=18) are configured for use by SRS, in which sixteen symbols (Ns-total=16) are used for actually transmitting SRS while the remaining two symbols (e.g. symbol #4 of the first configured subframe and symbol #4 of the second configured subframe) are used for guard period.

Figure 21:
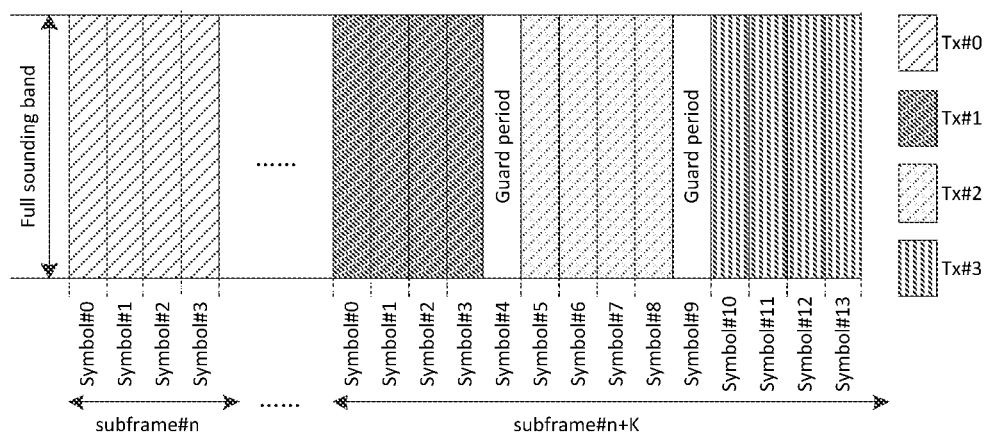
FIG. 21 a sixth example of the aperiodic SRS transmission according to the thirteenth embodiment.

FIG. 21 a sixth example of the aperiodic SRS transmission according to the thirteenth embodiment with the repetition R=4 with guard period, in which Nst-total=18 and Ns-total=16 (CS=2, Nst=Ns=4 in the first configured subframe and Nst=14 and Ns=12 in the second configured subframe with two one-symbol guard periods).

As shown in FIG. 21, antenna port 0, i.e., Tx #0 is used to transmit SRS in full sounding band at symbol #0, symbol #1, symbol #2 and symbol #3 of the first configured subframe (i.e. subframe #n). Antenna port 1, i.e., Tx #1 is used to transmit SRS in full sounding band at symbol #0, symbol #1, symbol #2 and symbol #3 of the second configured subframe (i.e. subframe #n+K). At symbol #4 of the second configured subframe, a one-symbol guard period is added when the antenna port switches from antenna port 1 to antenna port 2. Antenna port 2, i.e., Tx #2 is used to transmit SRS in full sounding band at symbol #5, symbol #6, symbol #7 and symbol #8 of the second configured subframe. At symbol #9 of the second configured subframe, a one-symbol guard period is added when the antenna port switches from antenna port 2 to antenna port 3. Antenna port 3, i.e., Tx #3, is used to transmit SRS in full band at symbol #10, symbol #11, symbol #12 and symbol #13 of the second configured subframe. As shown in FIG. 21, a total of eighteen symbols (Nst-total=18) are configured for use by SRS, in which sixteen symbols (Ns-total=16) are used for actually transmitting SRS while the remaining two symbols (e.g. symbol #4 of the second configured subframe and symbol #8 of the second configured subframe) are used for guard period.

In the sixth example of the thirteenth embodiment, one antenna port is used to transmit SRS in the first configured subframe and three antenna ports are used to transmit SRS in the second configured subframe. Alternatively, three antenna ports may be used to transmit SRS in the first configured subframe and one antenna port may be used to transmit SRS in the second configured subframe.

Figure 22:
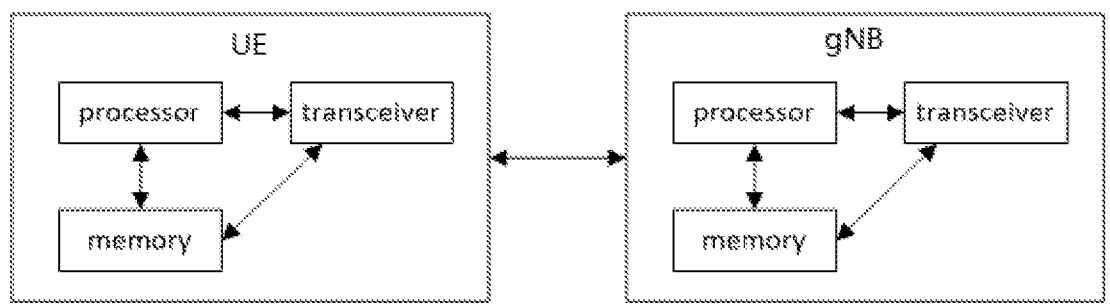
FIG. 22 is a schematic block diagram illustrating apparatuses according to one embodiment.

FIG. 22 is a schematic block diagram illustrating apparatuses according to one embodiment.

Referring to FIG. 22, the UE includes a processor, a memory, and a transceiver. The processor implements a function, a process, and/or a method which are proposed in FIGS. 1 to 21 above. The gNB (i.e. base station) includes a processor, a memory, and a transceiver. The processors implement a function, a process, and/or a method which are proposed in FIGS. 1 to 21 above. Layers of a radio interface protocol may be implemented by the processors. The memories are connected with the processors to store various pieces of information for driving the processors. The transceivers are connected with the processors to transmit and/or receive a radio signal. Needless to say, the transceiver may be implemented as a transmitter to transmit the radio signal and a receiver to receive the radio signal.

The memories may be positioned inside or outside the processors and connected with the processors by various well-known means. Further, the relay node may have a single antenna or multiple antennas.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method at a base station, the method comprising:
configuring one or more higher layer parameter sets for additional sounding reference signal (SRS) transmission with at least one of frequency hopping, repetition, and antenna switching; and
transmitting a downlink control information (DCI) containing a non-zero SRS request field or a higher layer signaling to trigger a SRS transmission in symbols in one or more normal subframes, wherein one of the parameter sets contains, for one aperiodic SRS transmission, 2 hops intra-subframe frequency hopping, with Ns=4 and R=2, or Ns=6 and R=3 or Ns=8 and R=4, each hop has the same bandwidth and each of antenna ports used for transmitting SRS is mapped to the same set of subcarriers, wherein Ns is a number of SRS symbols configured for transmitting SRS and R is repetition factor, and wherein, in response to no guard period being configured, a start symbol of the SRS transmission is configured as one of {0,1,2,3,4,5,6,7,8,9,10} corresponding to Ns=4, or one of {0,1,2,3,4,5,6,7,8} corresponding to Ns=6, or one of {0,1,2,3,4,5,6} corresponding to Ns=8.

2. The method of claim 1, wherein, in response to a one-symbol guard period being configured for a frequency hopping, the start symbol of the SRS transmission is configured as one of {0,1,2,3,4,5,6,7,8,9} corresponding to Ns=4, or one of {0,1,2,3,4,5,6,7} corresponding to Ns=6, or one of {0,1,2,3,4,5} corresponding to Ns=8.

3. The method of claim 1, wherein one of the parameter sets contains, for one aperiodic SRS transmission with antenna switching for a 1T4R capability user equipment without guard period, Nst-total=8 symbols with 2 hops intra-subframe frequency hopping in one subframe, or Nst-total=16 symbols with 4 hops intra-subframe frequency hopping in two subframes, wherein Nst-total is a number of adjacent SRS symbols configured for SRS.

4. The method of claim 3, wherein a full sounding bandwidth for each antenna port is 2 times of bandwidth of a subband across 2 adjacent symbols in one subframe and each of the antenna ports in said one subframe is mapped in the 2 adjacent symbols, or the full sounding bandwidth for each antenna port is 4 times of bandwidth of a subband across 4 adjacent symbols in one subframe and each of the antenna ports in said one subframe is mapped in the 4 adjacent symbols, and different antenna ports are mapped to different symbols.

5. The method of claim 3, wherein when Nst-total=16 or 18 symbols with 4 hops frequency hopping and antenna switching for one aperiodic SRS transmission across two normal subframes, two antenna ports are transmitted in each subframe or one antenna port is transmitted in one subframe and the other three antenna ports are transmitted in the other subframe.

6. The method of claim 1, wherein one of the parameter sets contains, for one aperiodic SRS transmission with antenna switching for a 1T4R capability user equipment with guard period for antenna switching within a subframe, Nst-total=11 symbols with 2 hops intra-subframe frequency hopping in one subframe, or Nst-total=18 symbols with 4 hops intra-subframe frequency hopping in two subframes, wherein Nst-total is a number of adjacent SRS symbols configured for SRS.

7. The method of claim 6, wherein the aperiodic SRS triggered by one downlink control information is transmitted in both additional SRS symbols and legacy SRS symbol.

8. The method of claim 1, wherein one of the parameter sets contains, for one aperiodic SRS transmission with antenna switching for a 1T4R capability user equipment without guard period, Nst-total=8 with repetition factor R=2 in one subframe, or Nst-total=12 with repetition factor R=3 in one subframe, or Nst-total=16 with repetition factor R=4 in two subframes, wherein Nst-total is a number of adjacent SRS symbols configured for SRS.

9. The method of claim 8, wherein each of the antenna ports is mapped in all R adjacent symbols to the same set of subcarriers, and different antennas are mapped to different symbols.

10. The method of claim 8, wherein when Nst-total=16 or 18 symbols with repetition factor R=4 and antenna switching for one aperiodic SRS transmission across two normal subframes, two antenna ports are transmitted in each subframe or one antenna port is transmitted in one subframe and the other three antenna ports are transmitted in the other subframe.

11. The method of claim 1, wherein one of the parameter sets contains, for one aperiodic SRS transmission with antenna switching for a 1T4R capability user equipment with guard period for antenna switching within a subframe, Nst-total=11 with repetition factor R=2 in one subframe, or Nst-total=14 with repetition factor R=3 in one subframe, or Nst-total=18 with repetition factor R=4 in two subframes, wherein Nst-total is a number of adjacent SRS symbols configured for SRS.

12. The method of claim 1, wherein transmitting a downlink control information with non-zero SRS request field to trigger an aperiodic SRS transmission across at least two normal subframes.

13. A base station, comprising:
at least one memory; and
at least one processor coupled with the at least one memory and configured to cause the base station to:
configure one or more higher layer parameter sets for additional sounding reference signal (SRS) transmission with at least one of frequency hopping, repetition, and antenna switching; and
transmit a downlink control information (DCI) containing a non-zero SRS request field or a higher layer signaling to trigger a SRS transmission in symbols in one or more normal subframes, wherein one of the parameter sets contains, for one aperiodic SRS transmission, 2 hops intra-subframe frequency hopping, with Ns=4 and R=2, or Ns=6 and R=3 or Ns=8 and R=4, each hop has the same bandwidth and each of antenna ports used for transmitting SRS is mapped to the same set of subcarriers, wherein Ns is a number of SRS symbols configured for transmitting SRS and R is repetition factor, and wherein in response to no guard period being configured, a start symbol of the SRS transmission is configured as one of $\{0,1,2,3,4,5,6,7,8,9,10\}$ corresponding to Ns=4, or one of $\{0,1,2,3,4,5,6,7,8\}$ corresponding to Ns=6, or one of $\{0, 1,2,3,4,5,6\}$ corresponding to Ns=8.

14. The base station of claim 13, wherein, in response to a one-symbol guard period being configured for a frequency hopping, the start symbol of the SRS transmission is configured as one of $\{0,1,2,3,4,5,6,7,8,9\}$ corresponding to Ns=4, or one of $\{0,1,2,3,4,5,6,7\}$ corresponding to Ns=6, or one of $\{0,1,2,3,4,5\}$ corresponding to Ns=8.

15. A user equipment (UE), comprising
at least one memory; and
at least one processor coupled with the at least one memory and configured to cause the UE to:
receive one or more higher layer parameter sets for sounding reference signal (SRS) transmission;
receive a downlink control information (DCI) containing a non-zero sounding reference signal (SRS) request field or a higher layer signaling to trigger a SRS transmission in symbols in one or more normal subframes, wherein one of the parameter sets contains, for one aperiodic SRS transmission, 2 hops intra-subframe frequency hopping, with Ns=4 and R=2, or Ns=6 and R=3 or Ns=8 and R=4, each hop has the same bandwidth and each of antenna ports used for transmitting SRS is mapped to the same set of subcarriers, wherein Ns is a number of SRS symbols configured for transmitting SRS and R is repetition factor, and wherein, in response to no guard period being configured, a start symbol of the SRS transmission is configured as one of $\{0,1,2,3,4,5,6,7,8,9,10\}$ corresponding to Ns=4, or one of $\{0,1,2,3,4,5,6,7,8\}$ corresponding to Ns=6, or one of $\{0,1,2,3,4,5,6\}$ corresponding to Ns=8; and
transmit an SRS in triggered symbols in one or more normal subframes.

16. The UE of claim 15, wherein the at least one processor is configured to cause the UE to perform group hopping or sequence hopping with a pattern determined at least based on a number of configured SRS symbols $N_{symb}^{SRS}$ and $l \in \{0,1,\ldots,N_{symb}^{SRS}-1\}$.

17. A method at a user equipment (UE), the method comprising:
receiving one or more higher layer parameter sets for sounding reference signal (SRS) transmission;
receiving a downlink control information (DCI) containing a non-zero sounding reference signal (SRS) request field or a higher layer signaling to trigger a SRS transmission in symbols in one or more normal subframes, wherein one of the parameter sets contains, for one aperiodic SRS transmission, 2 hops intra-subframe frequency hopping, with Ns=4 and R=2, or Ns=6 and R=3 or Ns=8 and R=4, each hop has the same bandwidth and each of antenna ports used for transmitting SRS is mapped to the same set of subcarriers, wherein Ns is a number of SRS symbols configured for transmitting SRS and R is repetition factor, and wherein, in response to no guard period being configured, a start symbol of the SRS transmission is configured as one of $\{0,1,2,3,4,5,6,7,8,9,10\}$ corresponding to Ns=4, or one of $\{0,1,2,3,4,5,6,7,8\}$ corresponding to Ns=6, or one of $\{0,1,2,3,4,5,6\}$ corresponding to Ns=8; and
transmitting an SRS in triggered symbols in one or more normal subframes.

* * * * *